United States Patent
Luo et al.

(10) Patent No.: US 10,999,749 B2
(45) Date of Patent: *May 4, 2021

(54) TERMINAL DEVICE, ACCESS NETWORK DEVICE, AIR INTERFACE CONFIGURATION METHOD, AND WIRELESS COMMUNICATIONS SYSTEM

(71) Applicant: HUAWEI TECHNOLOGIES CO., LTD., Guangdong (CN)

(72) Inventors: Haiyan Luo, Shanghai (CN); Hongzhuo Zhang, Shanghai (CN); Xiaoli Shi, Shanghai (CN); Wenjie Peng, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/853,009

(22) Filed: Apr. 20, 2020

(65) Prior Publication Data

US 2020/0252811 A1 Aug. 6, 2020

Related U.S. Application Data

(63) Continuation of application No. 16/028,983, filed on Jul. 6, 2018, now Pat. No. 10,652,764, which is a
(Continued)

(51) Int. Cl.
*H04W 24/02* (2009.01)
*H04W 92/20* (2009.01)
(Continued)

(52) U.S. Cl.
CPC ......... *H04W 24/02* (2013.01); *H04L 41/0803* (2013.01); *H04L 41/12* (2013.01);
(Continued)

(58) Field of Classification Search
CPC ... H04W 24/02; H04W 92/20; H04W 88/085; H04W 92/02; H04L 41/0803; H04L 41/12
See application file for complete search history.

(56) References Cited

U.S. PATENT DOCUMENTS

2004/0120317 A1* 6/2004 Forssell .................. H04L 47/24
370/394
2007/0255797 A1 11/2007 Dunn et al.
(Continued)

FOREIGN PATENT DOCUMENTS

| CN | 102857971 A | 1/2013 |
|---|---|---|
| CN | 103582079 A | 2/2014 |

(Continued)

OTHER PUBLICATIONS

3GPP TS 36.331 V13.0.0 (Dec. 2015),3rd Generation Partnership Project;Technical Specification Group Radio Access Network;Evolved Universal Terrestrial Radio Access (E-UTRA);Radio Resource Control (RRC);Protocol specification (Release 13),total 507 pages.
(Continued)

*Primary Examiner* — Thai Nguyen
(74) *Attorney, Agent, or Firm* — Fish & Richardson P.C.

(57) ABSTRACT

The present disclosure relates to terminal devices, access network devices, air interface configuration methods, and wireless communications systems. In one example method, a second access network device in a radio access network determines air interface configuration information of an air interface between a terminal device and the radio access network, and sends a first air interface configuration message comprising the air interface configuration information to a first access network device in the radio access network. The first access network device and the second access network device use different wireless communications standards.

17 Claims, 15 Drawing Sheets

Related U.S. Application Data continuation of application No. PCT/CN2016/070498, filed on Jan. 8, 2016.

(51) Int. Cl.
*H04W 88/08* (2009.01)
*H04L 12/24* (2006.01)
*H04W 92/02* (2009.01)

(52) U.S. Cl.
CPC ......... *H04W 88/085* (2013.01); *H04W 92/20* (2013.01); *H04W 92/02* (2013.01)

(56) References Cited

U.S. PATENT DOCUMENTS

| | | |
|---|---|---|
| 2011/0044218 A1 | 2/2011 | Kaur et al. |
| 2016/0157163 A1* | 6/2016 | Lee ............... H04W 56/00 370/338 |
| 2016/0255665 A1 | 9/2016 | Futaki |
| 2017/0085492 A1 | 3/2017 | Xiao et al. |
| 2017/0164221 A1* | 6/2017 | Tan Bergstrom ....... H04W 8/02 |
| 2018/0007583 A1 | 1/2018 | Hong et al. |
| 2018/0317164 A1 | 11/2018 | Luo et al. |

FOREIGN PATENT DOCUMENTS

| | | |
|---|---|---|
| CN | 104935413 A | 9/2015 |
| CN | 106165488 A | 11/2016 |
| EP | 2830352 A1 | 1/2015 |
| EP | 3065484 A1 | 9/2016 |
| WO | 2015063963 A1 | 5/2015 |
| WO | 2017113400 A1 | 7/2017 |
| WO | 2017113402 A1 | 7/2017 |

OTHER PUBLICATIONS

Carl Eklund et al.,"IEEE Standard 802.16:A Technical Overview of the WirelessMAN™ Air Interface for Broadband Wireless Access",IEEE Communications Magazine • Jun. 2002,total 10 pages.

Extended European Search Report issued in European Application No. 16882949 dated Sep. 28, 2018, 13 pages.

Huawei et al., "LTE-NR tight interworking control plane," 3GPP TSG-RAN WG2 Meeting #94, R2-164268; Nanjing, China, May 23-27, 2016, 4 pages.

Huawei et al., "LTE-NR tight interworking user plane," 3GPP TSG-RAN WG2 Meeting #94, R2-164269; Nanjing, China, May 23-27, 2016, 3 pages.

International Search Report issued in International Application No. PCT/CN2016/070498 dated Sep. 30, 2016, 20 pages.

Office Action issued in Chinese Application No. 201680076892.0 dated Mar. 12, 2020, 27 pages (with English translation).

XP050936455 R2-151538 Kyocera,"Scenario and Protocol architecture of LTE-WLAN aggregation",3GPP TSG-RAN WG2 #89-bis,Bratislava, Slovakia, Apr. 20-24, 2015,total 7 pages.

* cited by examiner

TERMINAL DEVICE, ACCESS NETWORK DEVICE, AIR INTERFACE CONFIGURATION METHOD, AND WIRELESS COMMUNICATIONS SYSTEM

CROSS-REFERENCE TO RELATED APPLICATIONS

This application is a continuation of U.S. application Ser. No. 16/028,983, filed on Jul. 6, 2018, which is a continuation of International Application No, PCT/CN2016/070498, filed on Jan. 8, 2016. The disclosure of all of the afore-mentioned patent applications are hereby incorporated by reference in their entirety.

TECHNICAL FIELD

This application relates to the field of wireless communications technologies, and in particular, to a terminal device, an access network device, an air interface configuration method, and a wireless communications system.

BACKGROUND

As wireless communications technologies develop, various future evolved wireless communications systems are emerging on the basis of a current wireless communications system. A future evolved wireless communications system may implement communication in a non-standalone working manner by using another existing wireless communications system.

For example, as shown in FIG. 1, a terminal device accesses a base station in a future evolved wireless communications system. The base station is referred to as a future evolved base station for short. Then the terminal device accesses a core network in a long term evolution (LTE) system by using an LTE base station connected to the future evolved base station.

A wireless communications system shown in FIG. 1 includes two parts: the terminal device and a network. The network includes a radio access network and a core network. There are two access network devices in the radio access network, and the two access network devices use different wireless communications standards (for example, one is a future evolved base station, and the other is an LTE base station). The two access network devices implement wireless access of user equipment, and each completes some processing in the radio access network. A current air interface configuration method used when a terminal device accesses only one radio access network device is no longer applicable to the case shown in FIG. 1.

SUMMARY

Embodiments of this application provide a terminal device, an access network device, an air interface configuration method, and a wireless communications system, to successfully establish a connection between a terminal device and two radio access network devices of different standards when the terminal device needs to access a wireless communications system by using the two access network devices.

According to a first aspect, an embodiment of this application provides an air interface configuration method, including:

determining, by a second access network device in a radio access network, air interface configuration information of an air interface between a terminal device and the radio access network, and sending a first air interface configuration message including the air interface configuration information to a first access network device in the radio access network, where the first access network device and the second access network device use different wireless communications standards; sending, by the first access network device, the received first air interface configuration message to the terminal device; and obtaining, by the terminal device, the air interface configuration information from the received first air interface configuration message, and configuring the air interface between the terminal device and the radio access network according to the air interface configuration information.

The air interface between the terminal device and the radio access network includes a first air interface protocol layer and a second air interface protocol layer. The first air interface protocol layer is between the terminal device and the first access network device, the second air interface protocol layer is between the terminal device and the second access network device, and the second air interface protocol layer is above the first air interface protocol layer. The first air interface configuration message is a message of an air interface protocol layer that is in the second air interface protocol layer and that is used to configure an air interface.

Based on a scenario in which there are two access network devices of different wireless communications standards in the radio access network and the two access network devices jointly provide a complete air interface protocol stack to the terminal device the foregoing method provides a method for configuring the air interface between the terminal device and the radio access network.

The first air interface configuration message is a message of the second air interface protocol layer existing only between the terminal device and the second access network device, and no second air interface protocol layer exists between the terminal device and the first access network device. Therefore, an air interface needs to be configured for the terminal device by sending a message to the terminal device by the second access network device.

In an optional implementation solution, after determining the air interface configuration information, the second access network device sends a second air interface configuration message to the first access network device, where the second air interface configuration message includes configuration information of the first air interface protocol layer in the air interface configuration information; and the first access network device configures the first air interface protocol layer according to the configuration information of the first air interface protocol layer in the received second air interface configuration message.

The second access network device sends the second air interface configuration message to the first access network device, so that the first access network device configures the first air interface protocol layer between the first access network device and the terminal device, and configuration information of the first air interface protocol layer received by the terminal device is the same as that received by the first access network device. This ensures communication between the two devices at the first air interface protocol layer.

In another optional implementation solution, the first access network device determines configuration information of the first air interface protocol layer, adds the determined configuration information of the first air interface protocol layer to a third air interface configuration message, and sends the third air interface configuration message to the second access network device; the second access network device obtains the configuration information of the first air interface protocol layer from the received third air interface configuration message, adds, to the first air interface configuration message, the configuration information of the first air interface protocol layer obtained from the third air interface configuration message, and sends the first air interface configuration message to the terminal device.

The first access network device determines the configuration information of the first air interface protocol layer between the first access network device and the terminal device, and sends the configuration information to the second access network device, and the second access network device then sends the received configuration information of the first air interface protocol layer to the terminal device by using the first air interface configuration message. In this way, the first access network device can configure the first air interface protocol layer between first access network device and the terminal device.

Further, if the first access network device determines the configuration information of the first air interface protocol layer, adds the determined configuration information of the first air interface protocol layer to the third air interface configuration message, and sends the third air interface configuration message to the second access network device, the first access network device further performs configuration according to the determined configuration information of the first air interface protocol layer, and configuration information of the first air interface protocol layer received by the terminal device is the same as the configuration information used when the first access network device performs configuration. This ensures communication between the two devices at the first air interface protocol layer.

With reference to the first aspect or either of the foregoing optional implementation solutions of the first aspect, in an optional implementation solution, a second wireless communications system is a long term evolution (LTE) system, and a first wireless communications system is a 5G system.

According to a second aspect, an embodiment of this application provides a second access network device. The second access network device has a function of implementing operations of the second access network device in the foregoing method. The function may be implemented by using hardware, or may be implemented by hardware executing corresponding software. The hardware or software includes one or more modules corresponding to the foregoing function.

In an optional implementation solution, a structure of the second access network device includes a processor and a transmitter. The processor is configured to support the second access network device in implementing corresponding functions in the foregoing method. The transmitter is configured to support the second access network device in sending, to a first access network device, a message or data included in the foregoing method. Optionally, the second access network device may further include a receiver, configured to receive, from the first access network device, a message or data included in the foregoing method. The second access network device may further include a memory. The memory is configured to be coupled with the processor, and the memory stores a program instruction and data necessary for the second access network device.

According to a third aspect, an embodiment of this application provides a first access network device. The first access network device has a function of implementing operations of the first access network device in the foregoing method. The function may be implemented by using hardware, or may be implemented by hardware executing corresponding software. The hardware or software includes one or more modules corresponding to the foregoing function.

In an optional implementation solution, a stricture of the first access network device includes a receiver, configured to support the first access network device in receiving, from a second access network device, a message or data included in the foregoing method; and a first transmitter, configured to support the first access network device in sending, to a terminal device, a message or data included in the foregoing method. Optionally, the first access network device further includes a processor, configured to support the second access network device in implementing corresponding functions in the foregoing method. The first access network device may further include a memory. The memory is configured to be coupled with the processor, and the memory stores a program instruction and data necessary for the first access network device.

According to a fourth aspect, an embodiment of this application provides a terminal device. The terminal device has a function of implementing operations of the terminal device in the foregoing method. The function may be implemented by using hardware, or may be implemented by hardware executing corresponding software. The hardware or software includes one or more modules corresponding to the foregoing function.

In an optional implementation solution, a structure of the terminal device includes a receiver, configured to support the terminal device in receiving, from a first access network device, a message or data included in the foregoing method; and a processor, configured to support the terminal device in implementing corresponding functions in the foregoing method. Optionally, the terminal device further includes a memory, the memory is configured to be coupled with the processor, and the memory stores a program instruction and data necessary for the terminal device.

According to a fifth aspect, an embodiment of this application provides a wireless communications system. The wireless communications system includes the terminal device, the first access network device, and the second access network device according to any one of the first to the fourth aspects.

According to a sixth aspect, an embodiment of this application provides a computer storage medium, configured to store a computer software instruction used by the second access network device according to any one of the first to the fifth aspects. The computer software instruction includes programs designed for executing the foregoing aspects.

According to a seventh aspect, an embodiment of this application provides a computer storage medium, configured to store a computer software instruction used by the first access network device according to any one of the first to the fifth aspects. The computer software instruction includes programs designed for executing the foregoing aspects.

According to an eighth aspect, an embodiment of this application provides a computer storage medium, configured to store a computer software instruction used by the terminal device according to any one of the first to the fifth aspects. The computer software instruction includes programs designed for executing the foregoing aspects.

According to a ninth aspect, an embodiment of this application provides an air interface configuration method, including: determining, by a second access network device in a radio access network, air interface configuration information of an air interface between a terminal device and the radio access network, adding the determined air interface configuration information to a first air interface configuration message, and sending the first air interface configuration message to a first access network device in the radio access network; sending, by the first access network device, the received first air interface configuration message to the terminal device; and obtaining, by the terminal device, the air interface configuration information from the first air interface configuration message, and configuring an air interface between the terminal device and the radio access network according to the air interface configuration information, where the air interface between the terminal device and the radio access network includes a first air interface and a second air interface; the first air interface includes a first air interface protocol layer and a second air interface protocol layer, the first air interface protocol layer is between the terminal device and the first access network device, the second air interface protocol layer is between the terminal device and the second access network device, and the second air interface protocol layer is above the first air interface protocol layer; the second air interface is an air interface between the terminal device and the second access network device; and the first air interface configuration message is a message of an air interface protocol layer that is included in the second air interface and that is used to configure an air interface.

Based on a scenario in which there are two access network devices of different wireless communications standards in the radio access network, the two access network devices jointly provide a complete air interface protocol stack to the terminal device over an air interface between the terminal device and the first access network device, and the second access network device also provides another complete set of air interface protocol stack to the terminal device, the foregoing method provides a method for configuring the air interface between the terminal device and the radio access network. The first air interface configuration message is the message of the air interface protocol layer that is included in the second air interface between the terminal device and the second access network device and that is used to configure an air interface. This achieves an objective of configuring the first air interface and the second air interface by using the second access network device.

In addition, the terminal device not only establishes an air interface connection to the first access network device, but also establishes an air interface connection to the second access network device. In this case, when the terminal device moves from a coverage area of a cell managed by the first access network device to a coverage area of a cell managed by the second access network device, there is no need to establish an air interface connection any further. This can implement a quick and seamless handover.

In an optional implementation solution, the second air interface includes a third air interface protocol layer and a fourth air interface protocol layer, the fourth air interface protocol layer is above the third air interface protocol layer, and the fourth air interface protocol layer and the second air interface protocol layer include a same type of protocol layer;

the first air interface configuration message is a message of an air interface protocol layer that is in the fourth air interface protocol layer and that is used to configure an air interface; and the fourth air interface protocol layer and the second air interface protocol layer are a same air interface protocol layer; or the fourth air interface protocol layer and the second air interface protocol layer are independent from each other.

In an optional implementation solution, after determining the air interface configuration information, the second access network device sends a second air interface configuration message to the first access network device, where the second air interface configuration message includes configuration information of the first air interface protocol layer in the air interface configuration information.

The first access network device receives the second air interface configuration message from the second access network device, where the second air interface configuration message includes the configuration information of the first air interface protocol layer in the air interface configuration information. The first access network device configures the first air interface protocol layer according to the configuration information of the first air interface protocol layer in the received second air interface configuration message.

The second access network device sends the second air interface configuration message to the first access network device, so that the first access network device configures the first air interface protocol layer between the first access network device and the terminal device, and configuration information of the first air interface protocol layer received by the terminal device is the same as that received by the first access network device. This ensures communication between the two devices at the first air interface protocol layer.

In another optional implementation solution, the first access network device determines configuration information of the first air interface protocol layer, adds the determined configuration information of the first air interface protocol layer to a third air interface configuration message, and sends the third air interface configuration message to the second access network device; and the second access network device adds, to the first air interface configuration message, the configuration information of the first air interface protocol layer received from the first access network device, and sends the first air interface configuration message to the terminal device.

The first access network device determines the configuration information of the first air interface protocol layer between the first access network device and the terminal device, and sends the configuration information to the second access network device, and the second access network device then sends the received configuration information of the first air interface protocol layer to the terminal device by using the first air interface configuration message. In this way, the first access network device can configure the first air interface protocol layer between first access network device and the terminal device.

Further, if the first access network device determines the configuration information of the first air interface protocol layer, and sends the determined configuration information of the first air interface protocol layer to the second access network device, the first access network device further performs configuration according to the determined configuration information of the first air interface protocol layer, and configuration information of the first air interface protocol layer received by the terminal device is the same as the configuration information used when the first access network device performs configuration. This ensures communication between the two devices at the first air interface protocol layer.

With reference to the ninth aspect or either of the foregoing optional implementation solutions of the ninth aspect, in an optional implementation solution, a second wireless communications system is a Long Term Evolution (LTE) system, and a first wireless communications system is a 5$^{th}$ Generation 5G system.

According to a tenth aspect, an embodiment of this application provides a second access network device, where the second access network device has a function of implementing operations of the second access network device in the foregoing method. The function may be implemented by using hardware, or may be implemented by hardware executing corresponding software. The hardware or software includes one or more modules corresponding to the foregoing function.

In an optional implementation solution, a structure of the second access network device includes a processor and a transmitter. The processor is configured to support the second access network device in implementing corresponding functions in the foregoing method. The transmitter is configured to support the second access network device in sending, to a first access network device, a message or data included in the foregoing method. Optionally, the second access network device may further include a receiver, configured to receive, from the first access network device, a message or data included in the foregoing method. The second access network device may further include a memory. The memory is configured to be coupled with the processor, and the memory stores a program instruction and data necessary for the second access network device.

According to an eleventh aspect, an embodiment of this application provides a first access network device, where the first access network device has a function of implementing operations of the first access network device in the foregoing method. The function may be implemented by using hardware, or may be implemented by hardware executing corresponding software. The hardware or software includes one or more modules corresponding to the foregoing function.

In an optional implementation solution, a structure of the first access network device includes a receiver, configured to support the first access network device in receiving, from a second access network device, a message or data included in the foregoing method; and a first transmitter, configured to support the first access network device in sending, to a terminal device, a message or data included in the foregoing method. Optionally, the first access network device further includes a processor, configured to support the second access network device in implementing corresponding functions in the foregoing method. The first access network device may further include a memory. The memory is configured to be coupled with the processor, and the memory stores a program instruction and data necessary for the first access network device.

According to a twelfth aspect, an embodiment of this application provides a terminal device. The terminal device has a function of implementing operations of the terminal device in the foregoing method. The function may be implemented by using hardware, or may be implemented by hardware executing corresponding software. The hardware or software includes one or more modules corresponding to the foregoing function.

In an optional implementation solution, a structure of the terminal device includes a receiver, configured to support the terminal device in receiving, from a first access network device, a message or data included in the foregoing method; and a processor, configured to support the terminal device in implementing corresponding functions in the foregoing method. Optionally, the terminal device further includes a memory, the memory is configured to be coupled with the processor, and the memory stores a program instruction and data necessary for the terminal device.

According to a thirteenth aspect, an embodiment of this application provides a wireless communications system. The wireless communications system includes the terminal device, the first access network device, and the second access network device according to any one of the ninth to the twelfth aspects.

According to a fourteenth aspect, an embodiment of this application provides a computer storage medium, configured to store a computer software instruction used by the second access network device according to any one of the ninth to the thirteenth aspects. The computer software instruction includes programs designed for executing the foregoing aspects.

According to a fifteenth aspect, an embodiment of this application provides a computer storage medium, configured to store a computer software instruction used by the first access network device according to any one of the ninth to the thirteenth aspects. The computer software instruction includes programs designed for executing the foregoing aspects.

According to a sixteenth aspect, an embodiment of this application provides a computer storage medium, configured to store a computer software instruction used by the terminal device according to any one of the ninth to the thirteenth aspects. The computer software instruction includes programs designed for executing the foregoing aspects.

DESCRIPTION OF EMBODIMENTS

To make the objectives, solutions, and advantages of the embodiments of this application more understandable, the following provides detailed descriptions. The detailed descriptions provide various implementations of an apparatus and/or a method by using block diagrams, flowcharts, other accompany drawings, and/or examples. These block diagrams, flowcharts, and/or examples include one or more functions and/or operations. Persons skilled in the art may understand that each function and/or operation in the block diagrams, the flowcharts, and/or the examples can be performed independently or jointly by using various types of hardware, software, and firmware, or any combination thereof.

The following explains some description of the embodiments of this application. It should be noted that, these explanations are intended to make the embodiments of this application more understandable, and should not be considered as a limitation on the protection scope required by the embodiments of this application.

1. Structure of a wireless communications system to which the embodiments of this application are applicable:

The embodiments of this application provide a wireless communications system, including:

a terminal device 201, a first access network device 202, and a second access network device 203. The first access network device 202 and the second access network device 203 use different wireless communications standards. A connection has been established between the devices.

The wireless communications system may further include a core network. The core network is connected to the second access network device 203.

Figure 1:
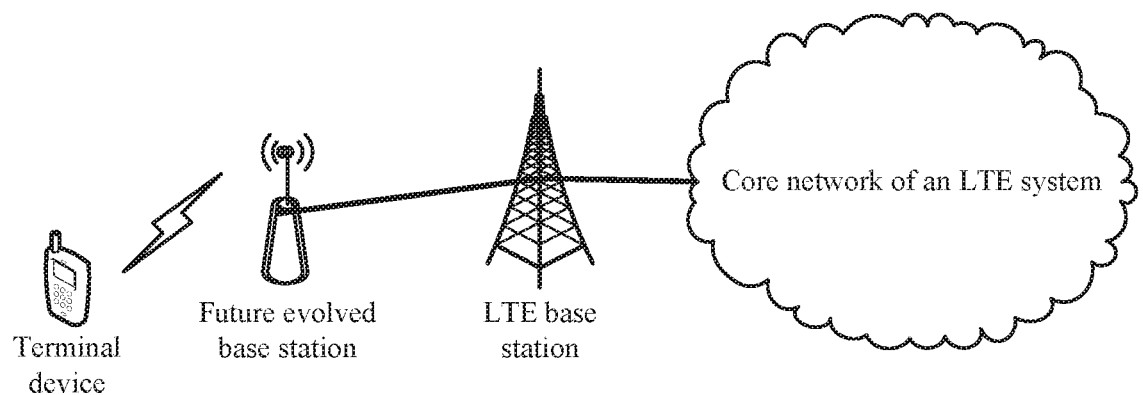
FIG. 1 is a network architecture diagram of a wireless communications system.
Figure 2A:
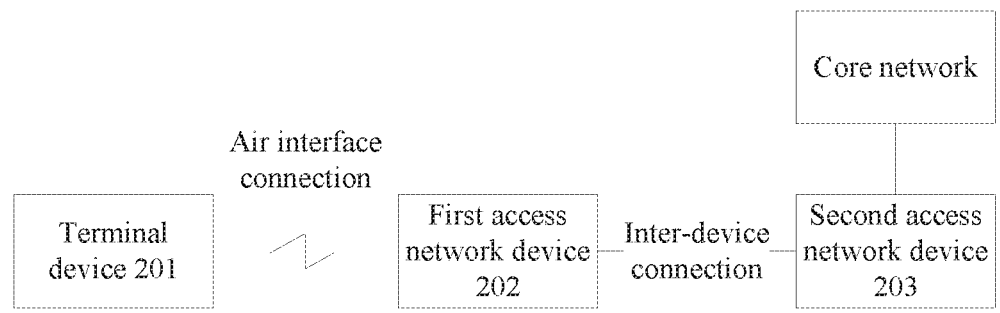
FIG. 2A and FIG. 2B are schematic diagrams of two structures of a wireless communications system according to an embodiment of this application.

One case is shown in FIG. 2A:

The terminal device 201 establishes an air interface connection only to the first access network device 202. The terminal device 201 may be connected to the core network by using the first access network device 202 and the second access network device 203.

Figure 2B:
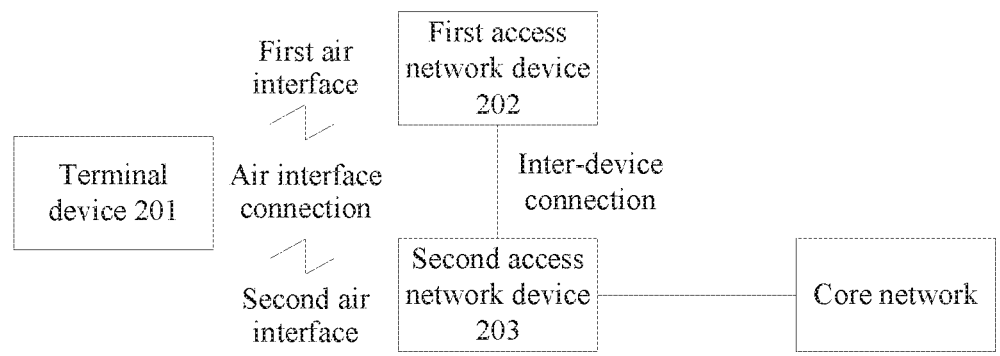

Another case is shown in FIG. 2B:

The terminal device 201 not only establishes an air interface connection to the first access network device 202, but also establishes an air interface connection to the second access network device 203. Herein, an air interface between the terminal device 201 and the first access network device 202 is referred to as a "first air interface", and an air interface between the terminal device 201 and the second access network device 203 is referred to as a "second air interface". The terminal device 201 is connected to the core network by using the second access network device 203.

Herein, the first access network device 202 and the second access network device 203 are devices in a radio access network. For example, the device may be a base station or a base station controller configured to control a base station, or may include a base station and a base station controller. For example, the first access network device 202 may be the aforementioned future evolved base station, for example, a $5^{th}$ generation (5G) base station, and the second access network device 203 may be a base station in a current wireless communications system.

A wireless communications standard of the second access network device 203 may include but not limited to: the global system for mobile communications (GSM), code division multiple access (CDMA) IS-95, code division multiple access (CDMA) 2000, time division-synchronous code division multiple access (TD-SCDMA), wideband code division multiple access (WCDMA), time division duplex-long term evolution (TDD LTE), frequency division duplex-long term evolution (FDD LTE), long term evolution-advanced (LTE-advanced), the personal handy-phone system (PHS), wireless fidelity (WiFi) stipulated in the 802.11 series of protocols, worldwide interoperability for microwave access (WiMAX), and various future evolved wireless communications systems.

The terminal device 201 may be a wireless terminal. The wireless terminal may be a device providing voice and/or data connectivity to a user, a handheld device having a wireless connection function, or another processing device connected to a wireless modem. The wireless terminal may communicate with one or more core networks by using a radio access network (RAN). The wireless terminal may be a mobile terminal, such as a mobile phone (also referred to as a "cellular" phone) or a computer having a mobile terminal. For example, the mobile terminal may be a portable mobile apparatus, a pocket-sized mobile apparatus, a handheld mobile apparatus, a computer built-in mobile apparatus, or an in-vehicle mobile apparatus. They exchange voice and/or data with the radio access network. For example, the wireless terminal is a personal communications service (PCS) phone, a cordless phone, a Session Initiation Protocol (SIP) phone, a wireless local loop (WLL) station, a personal digital assistant (PDA), or another device. The wireless terminal may alternatively be referred to as a subscriber unit, a subscriber station, a mobile station, a remote station, an access point, a remote terminal, an access terminal, a user terminal, a user agent, a user device, or user equipment.

In the case shown in FIG. 2A, the terminal device 201 establishes an air interface connection to the first access network device 202, and therefore, the terminal device 201 needs to support an air interface protocol used between the terminal device 201 and the first access network device 202. In addition, the terminal device 201 may need to be connected to the core network by using the second access network device 203, and when communicating with the second access network device 203, the terminal device 201 needs to support a communications protocol used when the terminal device 201 communicates with the second access network device 203. In addition, the terminal device 201 needs to be connected to the core network, and therefore, the terminal device 201 needs to support a communications protocol used when the terminal device 201 communicates with the core network.

In the case shown in FIG. 2B, the terminal device 201 establishes an air interface connection to the first access network device 202, and also establishes an air interface connection to the second access network device 203, and therefore, the terminal device 201 needs to support both an air interface protocol used between the terminal device 201 and the first access network device 202 and an air interface protocol used between the terminal device 201 and the second access network device 203. In addition, if the terminal device 201 needs to be connected to the core network, the terminal device 201 needs to support a communications protocol used when the terminal device 201 communicates with the core network.

The first access network device 202 and the second access network device 203 may include a base station or a radio resource management device configured to control a base station, or may include a base station and a radio resource management device configured to control a base station. The base station may be a macro base station or a small cell, for example, a small cell or a pico cell. The base station may alternatively be a home base station, for example, a home nodeB (HNB) or a home evolved nodeB (HeNB). The base station may alternatively include a relay node or the like.

2. Air interface protocol stack existing between the terminal device 201 and the first access network device 202 and the second access network device 203

In the embodiments of this application, there is no complete air interface protocol stack between the terminal device 201 and the first access network device 202. For example, only a layer 1 and a layer 2 are included, or only a layer 1 is included.

The following uses an example in which the first access network device 202 is a 5G base station and the second access network device 203 is an LTE base station for description.

1. In the Case Shown in FIG. 2A

The first access network device 202 and the second access network device 203 jointly provide a complete air interface protocol stack to the terminal device 201. There are the following three possible implementations.

Manner 1:

There is only a physical (PHY) layer, a media access control (MAC) layer, and a radio link control (RLC) layer between the first access network device 202 and the terminal device 201.

There is a packet data convergence protocol (PDCP) layer between the terminal device 201 and the second access network device 203. On a control plane (CP), there is a radio resource control (RRC) layer above the PDCP layer. On a user plane (UP), there is an internet protocol (IP) layer above the PDCP layer.

Figure 3A:
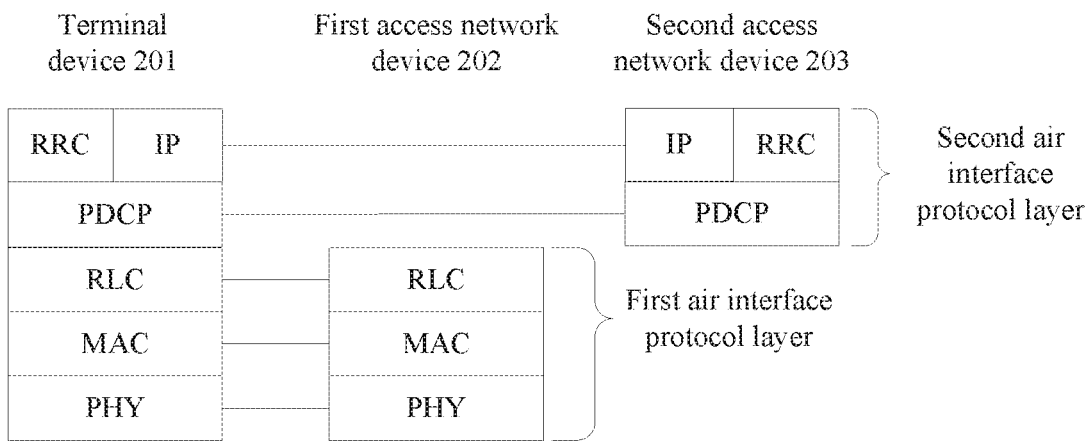
FIG. 3A to FIG. 3D are schematic structural diagrams of air interface protocol stacks used when a wireless communications system uses a structure shown in FIG. 2A according to an embodiment of this application.

When Manner 1 is used, a structure of a protocol stack existing between the terminal device 201 and the first access network device 202 and the second access network device 203 is shown in FIG. 3A.

Figure 5A:
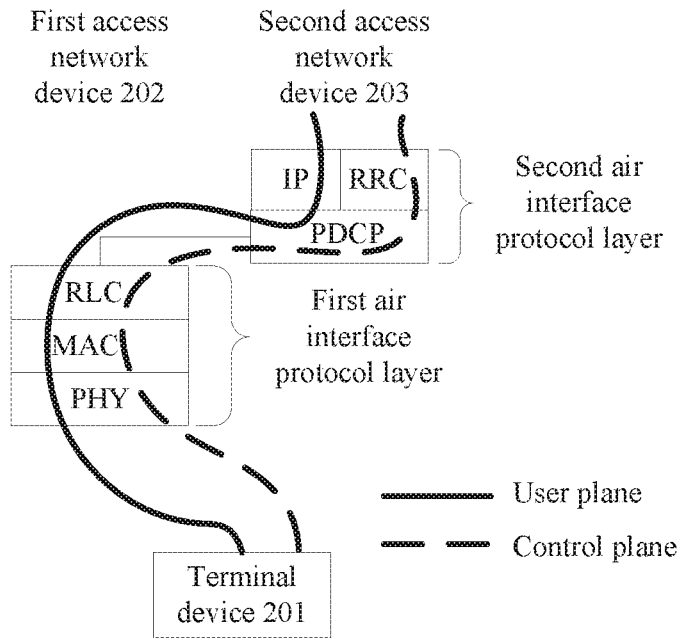
FIG. 5A to FIG. 5D are schematic diagrams of user plane and control plane based transmission performed when a wireless communications system uses a structure shown in FIG. 2A according to an embodiment of this application.

When Manner 1 is used, user plane based data transmission and control plane based signaling transmission may be shown in FIG. 5A.

When Manner 1 is used, the terminal device 201 may perform access by using the first access network device 202 in a dual connectivity (DC) manner. An anchor of the user plane and an anchor of the control plane are at the PDCP layer of the second access network device 203.

Manner 2:

There is only a PHY layer and a MAC layer between the first access network device 202 and the terminal device 201.

There is an RLC layer and a PDCP layer between the terminal device 201 and the second access network device 203. On a control plane, there is a radio resource control RRC layer above the PDCP layer. On a user plane, there is an IP layer above the PDCP layer.

Figure 3B:
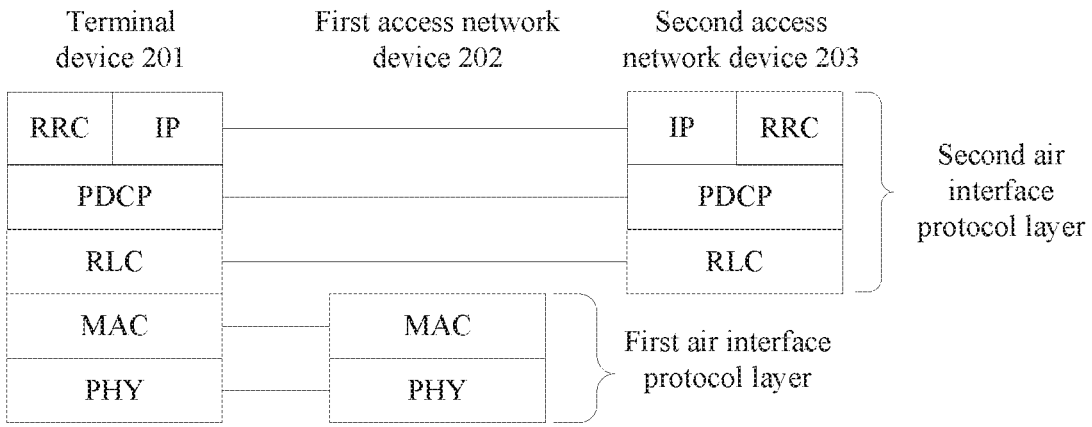

When Manner 2 is used, a structure of a protocol stack existing between the terminal device 201 and the first access network device 202 and the second access network device 203 is shown in FIG. 3B.

Figure 5B:
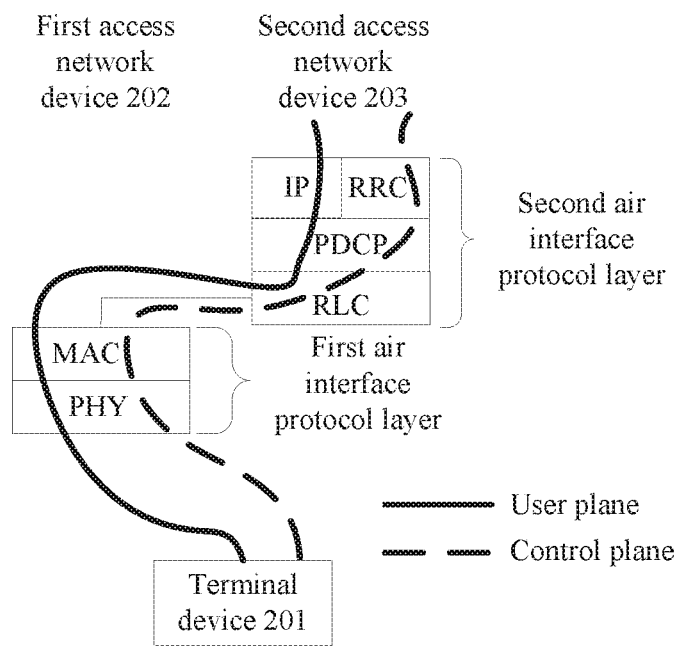

When Manner 2 is used, user plane based data transmission and control plane based signaling transmission may be shown in FIG. 5B.

When Manner 2 is used, the terminal device 201 may perform access by using the first access network device 202 in a DC manner. An anchor of the user plane and an anchor of the control plane are at the RLC layer of the second access network device 203.

Manner 3:

There is only a PHY layer and a part of a MAC layer between the first access network device 202 and the terminal device 201. The part of the MAC layer may be referred to as a "first MAC sublayer".

There is the other part of the MAC layer between the terminal device 201 and the second access network device 203. The other part of the MAC layer may be referred to as a "second MAC sublayer". An RLC layer and a PDCP layer are further included. On a control plane, there is a radio resource control RRC layer above the PDCP layer. On a user plane, there is an IP layer above the PDCP layer.

The first MAC sublayer may be used to implement a function, such as adding a MAC header. The second MAC sublayer may be used to implement a function, such as scheduling.

Figure 3C:
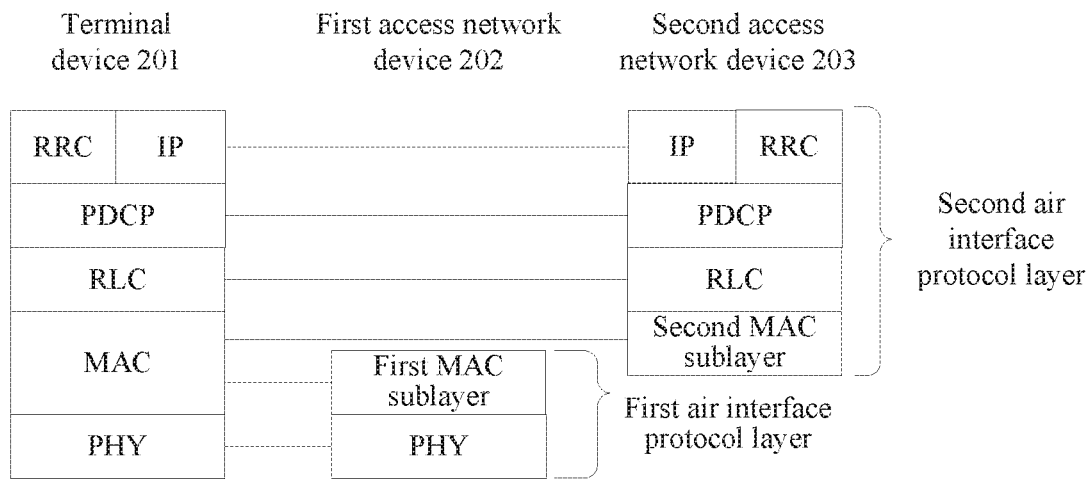

When Manner 3 is used, a structure of a protocol stack existing between the terminal device 201 and the first access network device 202 and the second access network device 203 is shown in FIG. 3C.

Figure 5C:
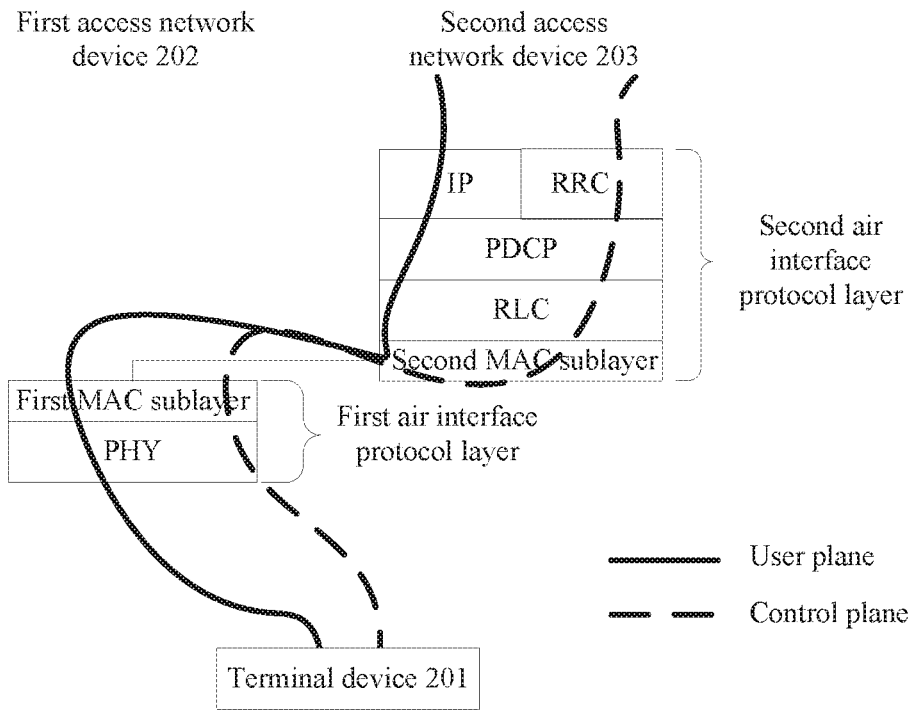

When Manner 3 is used, user plane based data transmission and control plane based signaling transmission may be shown in FIG. 5C.

When Manner 3 is used, the terminal device 201 may perform access by using the first access network device 202 in a carrier aggregation (CA) manner. An anchor of the user plane and an anchor of the control plane are at the second MAC sublayer of the second access network device 203.

Manner 4:

There is only a PHY layer between the first access network device 202 and the terminal device 201.

There is a MAC layer, an RLC layer, and a PDCP layer between the terminal device 201 and the second access network device 203. On a control plane, there is a radio resource control RRC layer above the PDCP layer. On a user plane, there is an IP layer above the PDCP layer.

Figure 3D:
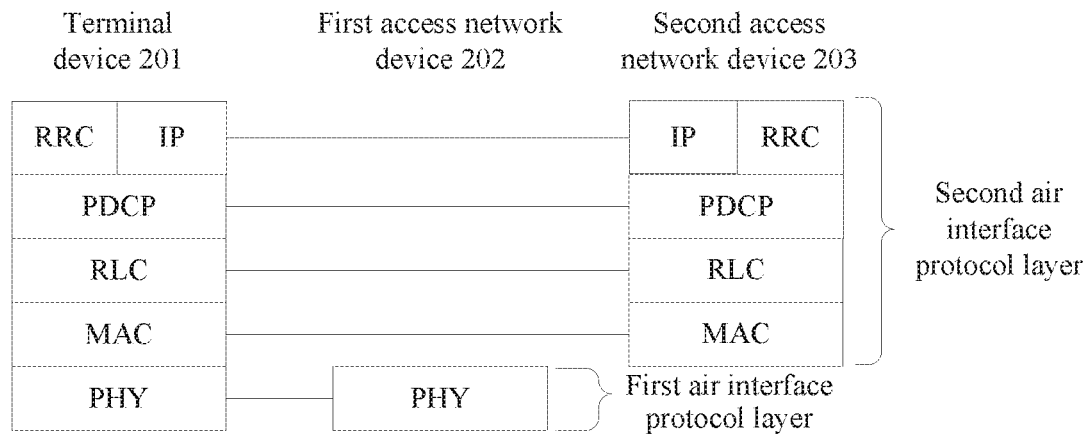

When Manner 4 is used, a structure of a protocol stack existing between the terminal device 201 and the first access network device 202 and the second access network device 203 is shown in FIG. 3D.

Figure 5D:
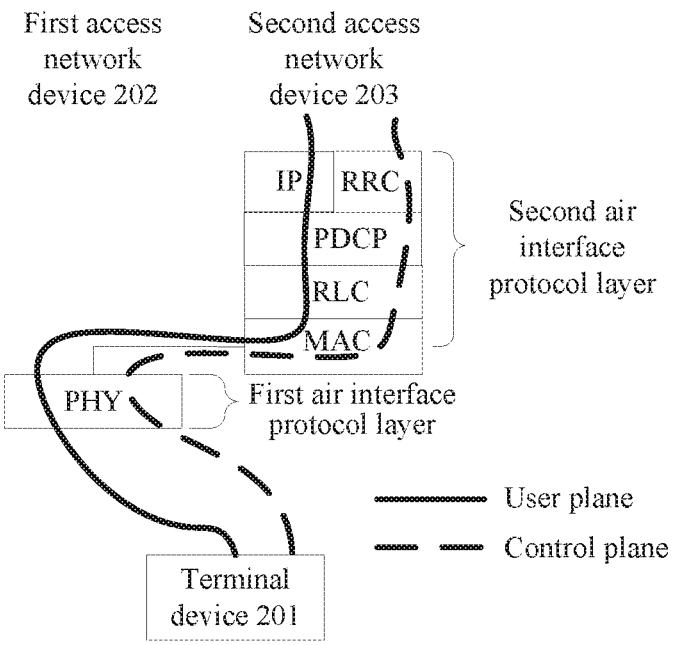

When Manner 4 is used, user plane based data transmission and control plane based signaling transmission may be shown in FIG. 5D.

When Manner 4 is used, the terminal device 201 may perform access by using the first access network device 202 in a CA manner. An anchor of the user plane and an anchor of the control plane are at the MAC layer of the second access network device 203.

In conclusion, in the foregoing four possible implementations, an air interface protocol layer between the first access network device 202 and the terminal device 201 is referred to as a "first air interface protocol layer", and an air interface protocol layer between the terminal device 201 and the second access network device 203 is referred to as a "second air interface protocol layer". The second air interface protocol layer is above the first air interface protocol layer, and exists only between the terminal device 201 and the second access network device 203.

The second air interface protocol layer includes an air interface protocol layer used to configure an air interface. For example, when the second access network device 203 is an LW base station, the air interface protocol layer used to configure an air interface may be an RRC layer.

2. In the Case Shown in FIG. 2B

There is an air interface connection between the terminal device 201 and the first access network device 202, and there is also an air interface connection between the terminal device 201 and the second access network device 203.

Herein, an air interface between the terminal device 201 and the first access network device 202 is referred to as a "first air interface", and an air interface between the terminal device 201 and the second access network device 203 is referred to as a "second air interface".

On the first air interface, the first access network device 202, and the second access network device 203 jointly provide a complete air interface protocol stack to the terminal device 201.

Possible implementations of an air interface protocol stack existing between the terminal device 201 and the first access network device 202 and the second access network device 203 may be divided into the following four manners according to possible different implementations of the first air interface. Certainly, another manner may exist, provided that communication between the terminal device 201 and the first access network device 202 and the second access network device 203 can be implemented.

Manner 1:

On the first air interface, there is only a PHY layer, a MAC layer, and an RLC layer between the first access network device 202 and the terminal device 201.

On the first air interface, there is a PDCP layer between the terminal device 201 and the second access network device 203. On a control plane, there is an RRC layer above the PDCP layer. On a user plane, there is an IP layer above the PDCP layer.

On the second air interface, there is a complete air interface protocol stack between the terminal device 201 and the second access network device 203. For example, the second access network device 203 is an LTE base station. There is a PHY layer, a MAC layer, an RLC layer, and a PDCP layer between the terminal device 201 and the second access network device 203. On a control plane, there is an RRC layer above the PDCP layer. On a user plane, there is an IP layer above the PDCP layer.

Figure 4A:
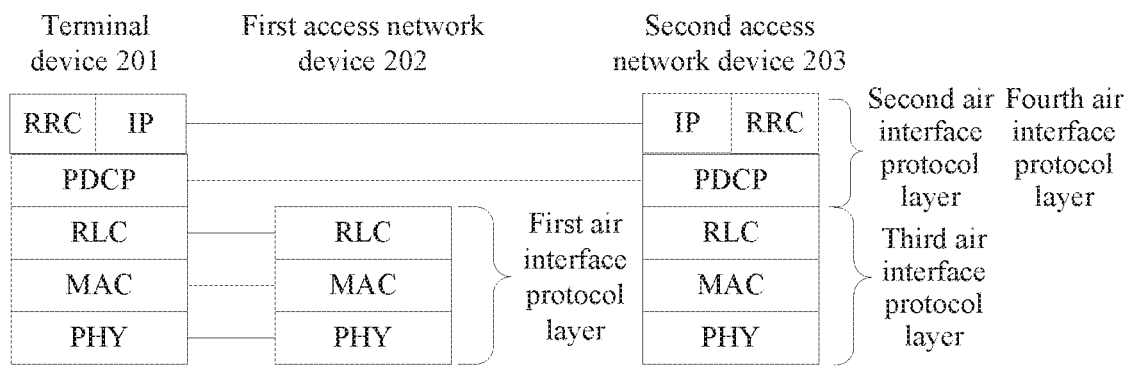
FIG. 4A to FIG. 4D are schematic structural diagrams of air interface protocol stacks used when a wireless communications system uses a structure shown in FIG. 2B according to an embodiment of this application.

When Manner 1 is used, a structure of a protocol stack existing between the terminal device 201 and the first access network device 202 and the second access network device 203 is shown in FIG. 4A.

Figure 6A:
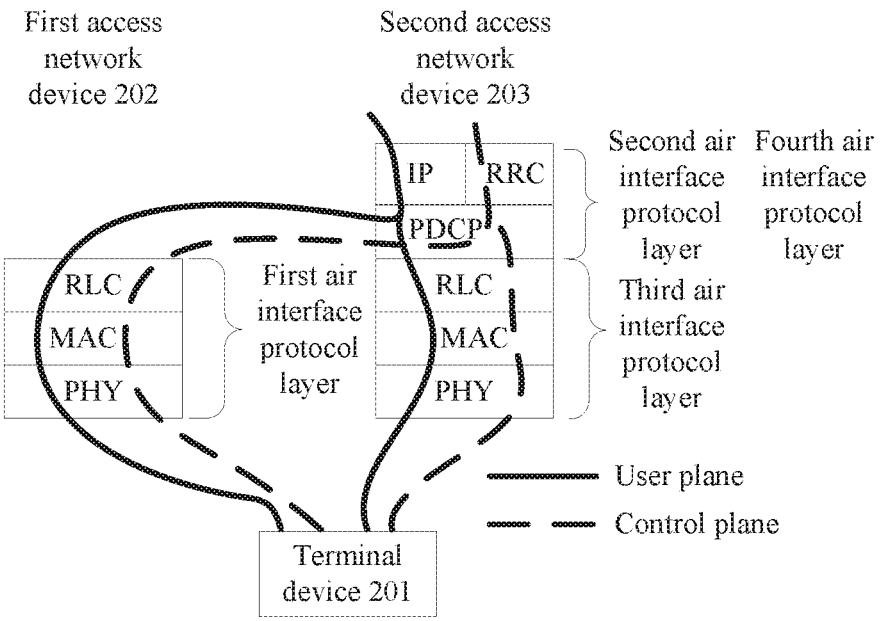
FIG. 6A to FIG. 6D are schematic diagrams of user plane and control plane based transmission performed when a wireless communications system uses a structure shown in FIG. 2B according to an embodiment of this application.

When Manner 1 is used, user plane based data transmission and control plane based signaling transmission may be shown in FIG. 6A.

When Manner 1 is used, on the first air interface, the terminal device 201 may perform access by using the first access network device 202 in a DC manner. An anchor of the user plane and an anchor of the control plane are at the PDCP layer of the second access network device 203.

Manner 2:

On the first air interface, there is only a PHY layer and a MAC layer between the first access network device 202 and the terminal device 201.

On the first air interface, there is an RLC layer and a PDCP layer between the terminal device 201 and the second access network device 203. On a control plane, there is an RRC layer above the PDCP layer. On a user plane, there is an IP layer above the PDCP layer.

On the second air interface, there is a complete air interface protocol stack between the terminal device 201 and the second access network device 203. For example, the second access network device 203 is an LTE base station. There is a PHY layer, a MAC layer, an RLC layer, and a PDCP layer between the terminal device 201 and the second access network device 203. On a control plane, there is an RRC layer above the PDCP layer. On a user plane, there is an IP layer above the PDCP layer.

Figure 4B:
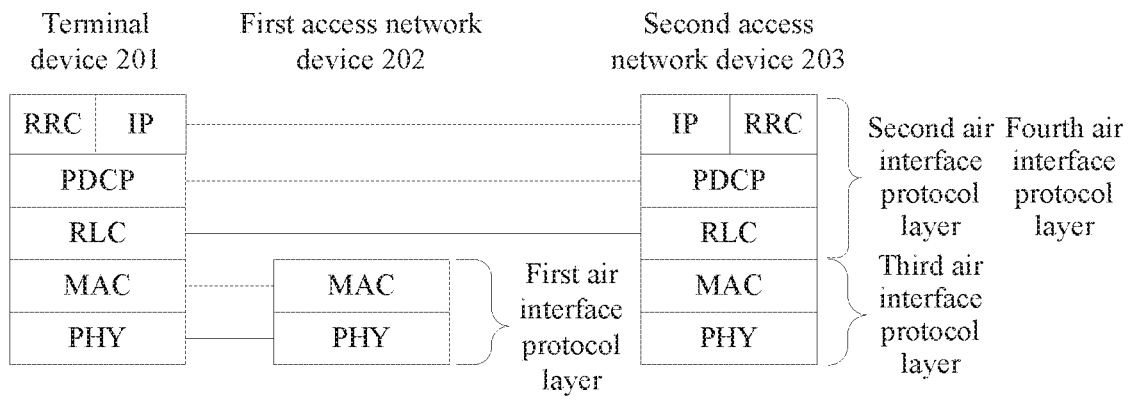

When Manner 2 is used, a structure of a protocol stack existing between the terminal device 201 and the first access network device 202 and the second access network device 203 is shown in FIG. 4B.

Figure 6B:
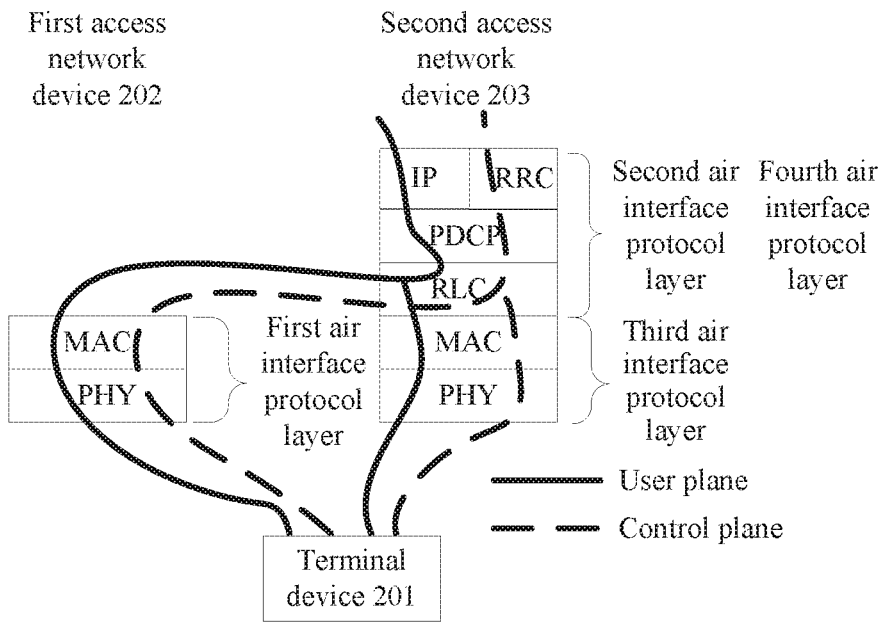

When Manner 2 is used, user plane based data transmission and control plane based signaling transmission may be shown in FIG. 6B.

When Manner 2 is used, on the first air interface, the terminal device 201 may perform access by using the first access network device 202 in a DC manner. An anchor of the user plane and an anchor of the control plane are at the RLC layer of the second access network device 203.

Manner 3:

On the first air interface, there is only a PEW layer and a part of a MAC layer between the first access network device 202 and the terminal device 201. The part of the MAC layer may be referred to as a "third MAC sublayer".

On the first air interface, there is the other part of the MAC layer between the terminal device 201 and the second access network device 203. The other part of the MAC layer may be referred to as a "fourth MAC sublayer". An RLC layer and a PDCP layer are further included. On a control plane, there is a radio resource control RRC layer above the PDCP layer. On a user plane, there is an IP layer above the PDCP layer.

The third MAC sublayer may be used to implement a function, such as adding a MAC header. The fourth MAC sublayer may be used to implement a function, such as scheduling.

On the second air interface, there is a complete air interface protocol stack between the terminal device 201 and the second access network device 203. For example, the second access network device 203 is an LTE base station. There is a PHY layer, a MAC layer, an RLC layer, and a PDCP layer between the terminal device 201 and the second access network device 203. On a control plane, there is an RRC layer above the PDCP layer. On a user plane, there is an IP layer above the PDCP layer. On the second air interface, the MAC layer may alternatively not be divided into a fourth MAC sublayer and a third MAC sublayer.

Figure 4C:
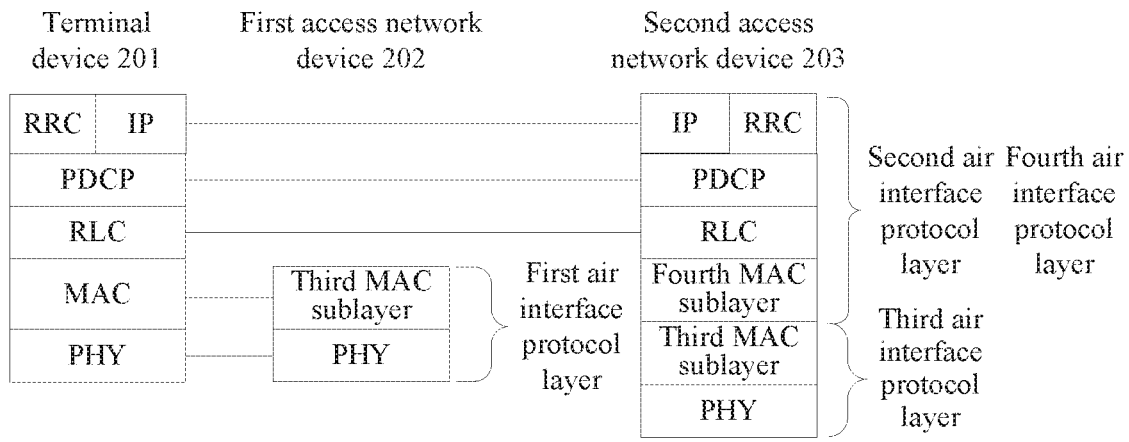

When Manner 3 is used, a structure of a protocol stack existing between the terminal device 201 and the first access network device 202 and the second access network device 203 is shown in FIG. 4C.

Figure 6C:
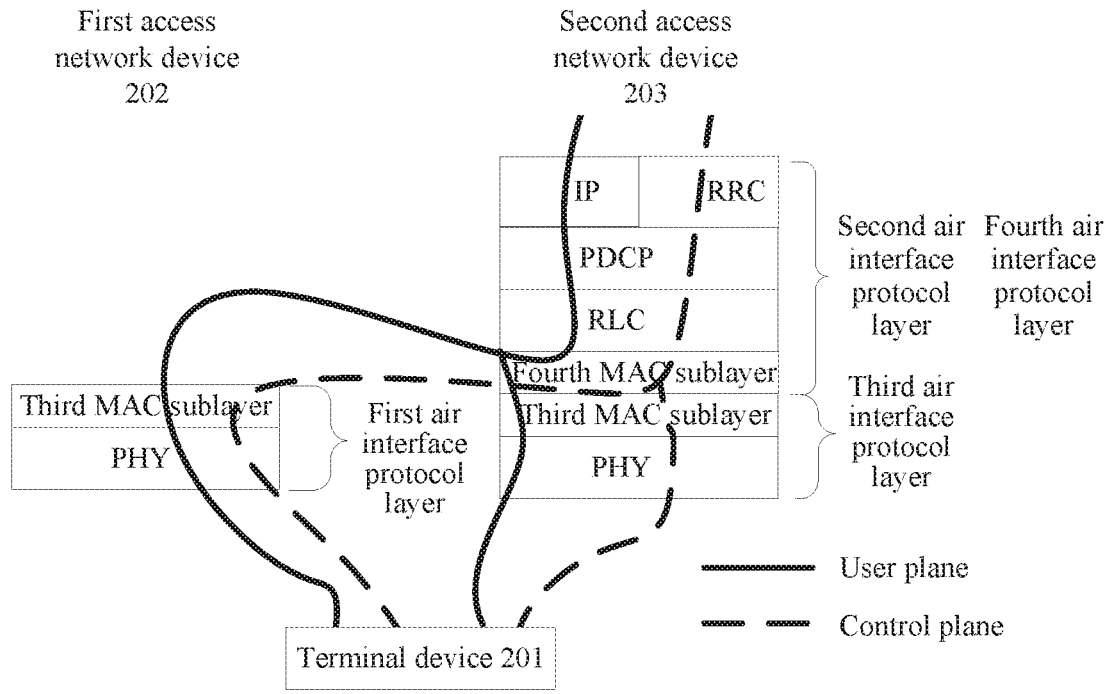

When Manner 3 is used, user plane based data transmission and control plane based signaling transmission may be shown in FIG. 6C.

When Manner 3 is used, on the first air interface, the terminal device 201 may perform access by using the first access network device 202 in a CA manner. An anchor of the user plane and an anchor of the control plane are at the fourth MAC sublayer of the second access network device 203.

Manner 4:

On the first air interface, there is only a PHS layer between the first access network device 202 and the terminal device 201.

On the first air interface, there is a MAC layer, an RLC layer, and a PDCP layer between the terminal device 201 and the second access network device 203. On a control plane, there is an RRC layer above the PDCP layer. On a user plane, there is an IP layer above the PDCP layer.

On the second air interface, there is a complete air interface protocol stack between the terminal device 201 and the second access network device 203. For example, the second access network device 203 is an LTE base station. There is a my layer, a MAC layer, an RLC layer, and a PDCP layer between the terminal device 201 and the second access network device 203. On a control plane, there is an RRC layer above the PDCP layer. On a user plane, there is an IP layer above the PDCP layer.

Figure 4D:
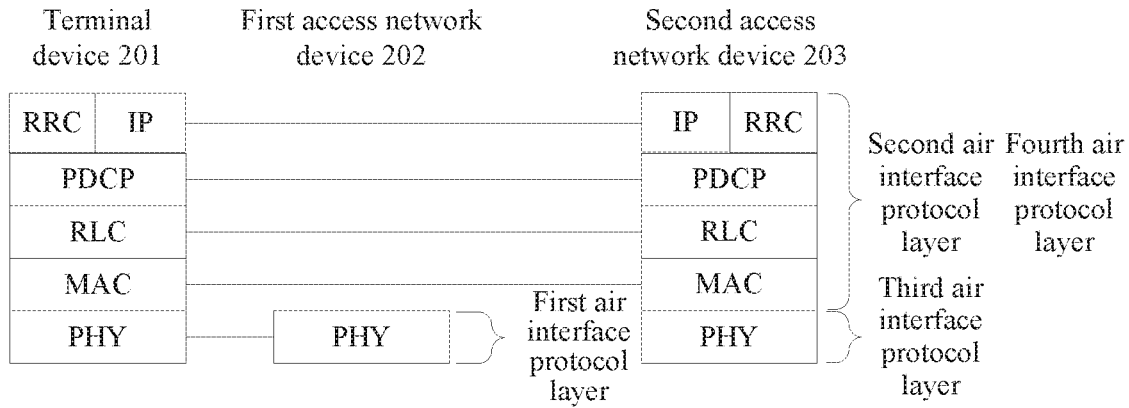

When Manner 4 is used, a structure of a protocol stack existing between the terminal device 201 and the first access network device 202 and the second access network device 203 is shown in FIG. 4D.

Figure 6D:
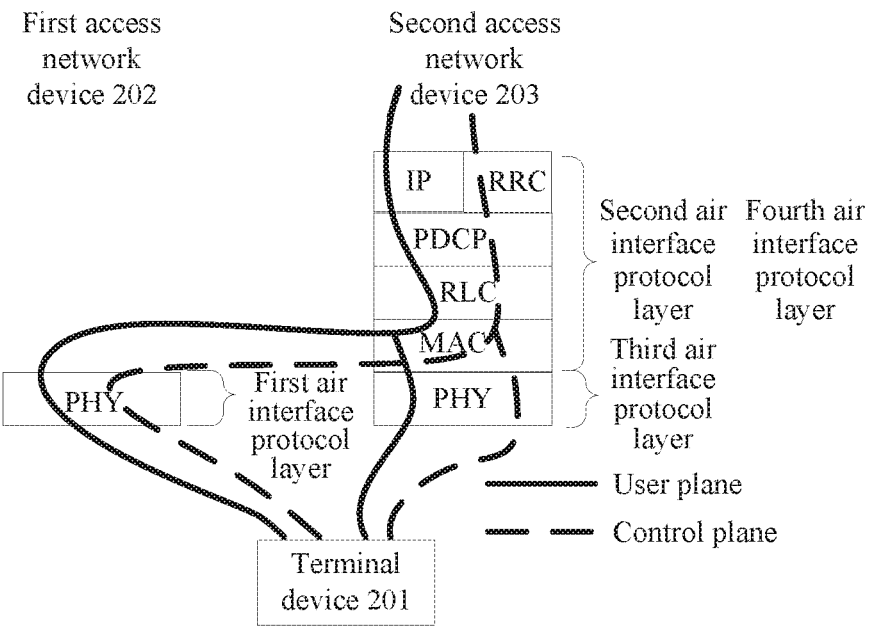

When Manner 4 is used, user plane based data transmission and control plane based signaling transmission may be shown in FIG. 6D.

When Manner 4 is used, on the first air interface, the terminal device 201 may perform access by using the first access network device 202 in a CA manner. An anchor of the user plane and an anchor of the control plane are at the MAC layer of the second access network device 203.

In conclusion, in the foregoing four possible implementations:

On the first air interface, an air interface protocol layer between the first access network device 202 and the terminal device 201 is referred to as a "first air interface protocol layer", and an air interface protocol layer between the terminal device 201 and the second access network device 203 is referred to as a "second air interface protocol layer". The second air interface protocol layer is above the first air interface protocol layer, and exists only between the terminal device 201 and the second access network device 203.

The second air interface protocol layer includes an air interface protocol layer used to configure an air interface. For example, when the second access network device 203 is an LW base station, the air interface protocol layer used to configure an air interface may be an RRC layer.

On the second air interface, a protocol stack included in the second air interface may be divided into a third air interface protocol layer and a fourth air interface protocol layer. The fourth air interface protocol layer is above the third air interface protocol layer. The fourth air interface protocol layer and the second air interface protocol layer include a same type of protocol layer. The fourth air interface protocol layer and the second air interface protocol layer are a same air interface protocol layer (FIG. 6A to FIG. 6D show cases in which the first air interface protocol layer and the second air interface protocol layer are a same air interface protocol layer). Alternatively, the fourth air interface protocol layer and the second air interface protocol layer are independent from each other.

3. Optional Manner for Air Interface Configuration

An objective of air interface configuration is to establish an air interface connection between a terminal device and an access network device, and the terminal device and the access network device can transmit signaling and data through the established air interface connection.

Optionally, in the embodiments of this application, an air interface configuration procedure in a current LTE system may be used: A control plane is first configured, and then, a user plane is configured.

On an air interface, signaling may be transmitted by using a signaling radio bearer (SRB), and data may be transmitted by using a data radio bearer (DRB).

Therefore, in an air interface configuration procedure, when an SRB and a DRB are configured, it may be considered that air interface configuration is completed.

1. Control Plane Establishment

According to definitions of an SRB and a DRB in the current LTE system, an SRB may be divided into an SRB 0, an SRB 1, and an SRB 2 according to transmission signaling content:

The SRB 0 may be used to transmit a request message, for example, an RRC connection request message used in the LTE system, that is sent by the terminal device 201 for requesting to establish an air interface connection.

The SRB 1 may be used to transmit a subsequent RRC message, and before an SRB 2 is established, transmit a non-access stratum (NAS) message. When an RRC connection is set up, it indicates that an SRB 1 link between the terminal device 201 and the first access network device 202 and the second access network device 203 is established, and then, the SRB 1 may be used to transmit an RRC message.

In the embodiments of this application, there is no RRC layer between the terminal device 201 and the first access network device 202. Therefore, the RRC message is transmitted between UE and the second access network device 203 after being processed by the first air interface protocol layer of the first access network device 202.

After receiving an RRC connection request message from the terminal device 201, if an RRC connection is allowed to be set up, the second access network device 203 sends an RRC connection setup message to the terminal device 201. The message includes configuration information used to configure an SRB 1. For example, the configuration information is:

an SRB identity (ID), RLC configuration information, and logical channel (LCH) configuration information.

The SRB 2 is used to transmit an NAS message. After the SRB 1 is successfully established, and after security is activated, an SRB 2 link may be established.

2. User Plane Establishment

In the embodiments of this application, a procedure in the LTE system may be used. After receiving an RRC connection setup message, the terminal device 201 returns an RRC connection setup complete message to the second access network device 203.

Then, the second access network device 203 may add an NAS message, for example, a service request message to an initial UE message that is to be sent to a core network, for example, a mobility management entity (MME). The core network may send an initial context setup request message to the second access network device 203. The initial context setup request message includes information required for configuring a DRB for the terminal device 201 by the second access network device 203, for example, a user equipment aggregate maximum bit rate (UE AMBR), an evolved universal terrestrial radio access network radio access bearer E-RAB), or quality of service (QoS).

After receiving the initial context setup request message from the core network, the second access network device 203 sends an RRC connection reconfiguration message to the terminal device 201 according to the information, required for configuring a DRB, that is included in the initial context setup request message. The RRC connection reconfiguration message includes DRB configuration information.

The DRB configuration information mainly includes an evolved packet system (EPS) bearer ID, a DRB ID, PDCP configuration information, RLC configuration information, an LCH ID, LCH configuration information, and the like.

For the foregoing configuration manners and procedures of the control plane and the user plane, reference has been made to the procedure in the current LTE system. Actually, in the embodiments of this application, another configuration manner may be used, provided that each air interface protocol layer can be configured for transmitting data and signaling and completing communication.

In a transmission process of the foregoing configuration message, in the case shown in FIG. 2A, a configuration message of an air interface connection between the terminal device 201 and the first access network device 202 needs to be forwarded by the first access network device 202. There is no complete air interface protocol stack between the terminal device 201 and the first access network device 202. Therefore, the configuration message needs to be parsed by the air interface protocol layer that is in the second air interface protocol layer between the second access network device 203 and the terminal device 201 and that is used to configure an air interface.

In a transmission process of the foregoing configuration message, in the case shown in FIG. 2B, a configuration message of the first air interface between the terminal device 201 and the first access network device 202 may be forwarded by the first access network device 202, and parsed and processed by the air interface protocol layer that is in the second air interface protocol layer between the second access network device 203 and the terminal device 201 and that is used to configure an air interface. Alternatively, the configuration message may not be forwarded by the first access network device 202, but directly transmitted over the second air interface between the terminal device 201 and the second access network device 203, and parsed and processed by an air interface protocol layer that is in the fourth air interface protocol layer between the terminal device 201 and the second access network device 203 and that is used to configure an air interface.

4. Establishment of a Connection Between the First Access Network Device 202 and the Second Access Network Device 203

To implement transmission of a message related to air interface configuration, in the embodiments of this application, a connection between the first access network device 202 and the second access network device 203 needs to be established.

For example, the first access network device 202 is a $5^{th}$ generation (5G) base station, and the second access network device 203 is an LTE base station. An interface is pre-established between the 5G base station and the LTE base station, and may be referred to as an "X5 interface".

For example, the 5G base station learns of a transport network layer (TNL) addressing address of the LTE base station by using an operation, administration, and maintenance (OAM) configuration, and then initiates a request for establishing an X5 interface. Alternatively, the LTE base station learns of a TNL addressing address of the 5G base station by using an OAM configuration, and then initiates a request for establishing an X5 interface. The 5G base station and the LTE base station may exchange cell load, a data transmission delay, a backhaul link capacity, or other information with each other by using the X5 interface.

The foregoing explains some description of the embodiments of this application. The following provides illustrative descriptions by using specific embodiments.

In both the case shown in FIG. 2A and the case of the first air interface shown in FIG. 2B, the first access network device 202 and the second access network device 203 need to jointly provide a complete air interface protocol stack to the terminal device 201, and the first access network device 202 cannot provide a complete air interface protocol stack to the terminal device 201. The following Embodiment 1 and Embodiment 2 provide a solution in which the first access network device 202 and the second access network device 203 jointly provide a complete air interface protocol stack to the terminal device 201.

In addition, if the terminal device 201 performs access only by using the first access network device 202, and there is no air interface connection between the terminal device 201 and the second access network device 203, a possible case is that the first access network device 202 has a relatively small coverage area. If the terminal device 201 is handed over from a cell managed by the first access network device 202 to a cell managed by the second access network device 203, there is a problem: how to provide a solution of quick handover. The following Embodiment 3 and Embodiment 4 separately provide a solution to this problem. In the solution, the terminal device 201 not only establishes an air interface connection to the first access network device 202, but also establishes an air interface connection to the second access network device 203. In this case, when the terminal device 201 moves from a coverage area of the cell managed by the first access network device 202 to a coverage area of the cell managed by the second access network device 203, there is no need to establish an air interface connection any further. This can implement a quick and seamless handover.

In Embodiment 1 and Embodiment 2, only an air interface between the terminal device 201 and the first access network device 202 is configured. In Embodiment 3 and Embodiment 4, not only a first air interface between the terminal device 201 and the first access network device 202 is configured, but also a second air interface between the terminal device 201 and the second access network device 203 is configured.

For ease of understanding, the following Table 1 lists main content of embodiments of the present disclosure and related accompanying drawings.

TABLE 1

Figure 7:
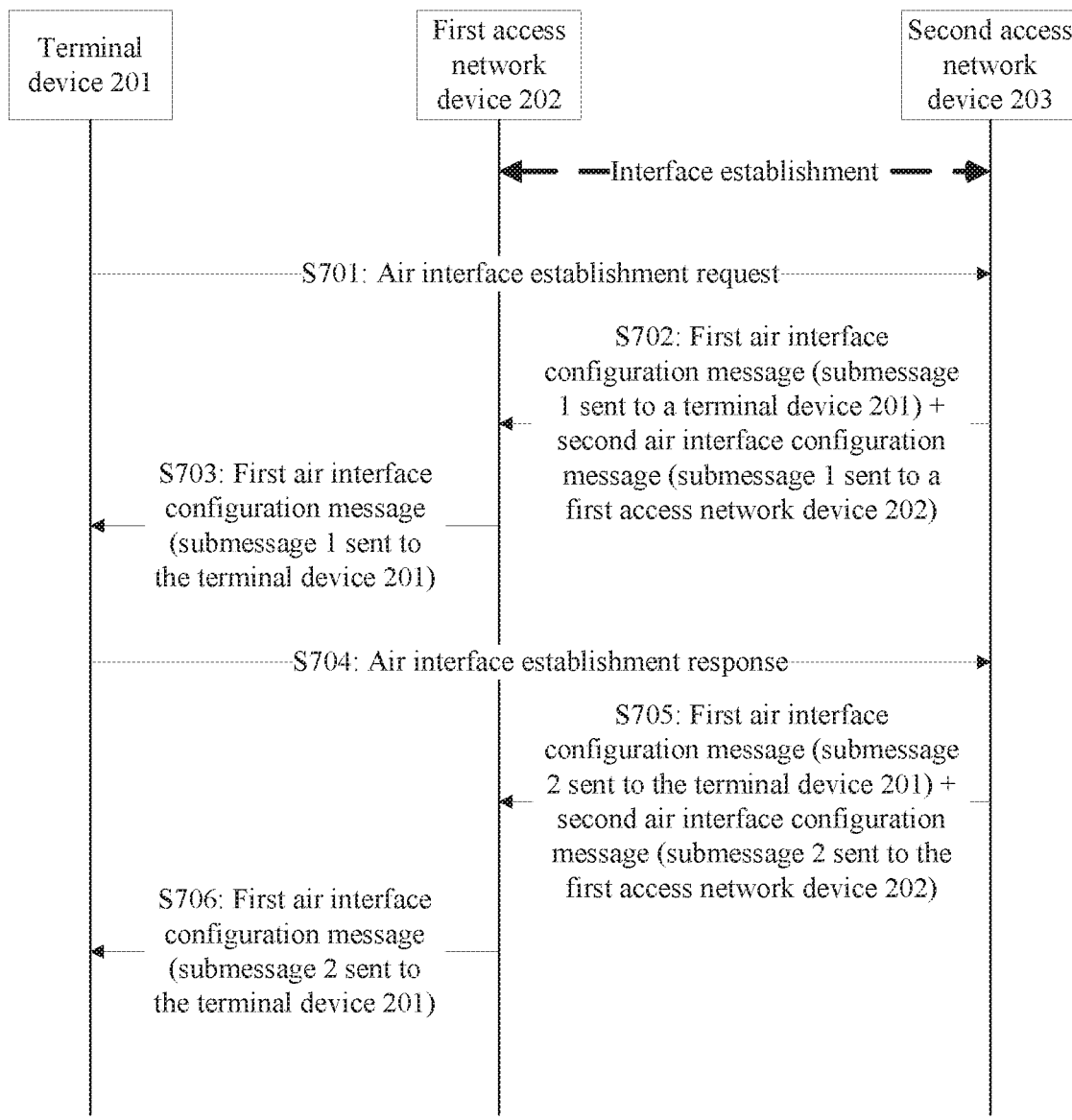
FIG. 7 is a schematic diagram of an air interface configuration procedure according to Embodiment 1 of this application.
Figure 8:
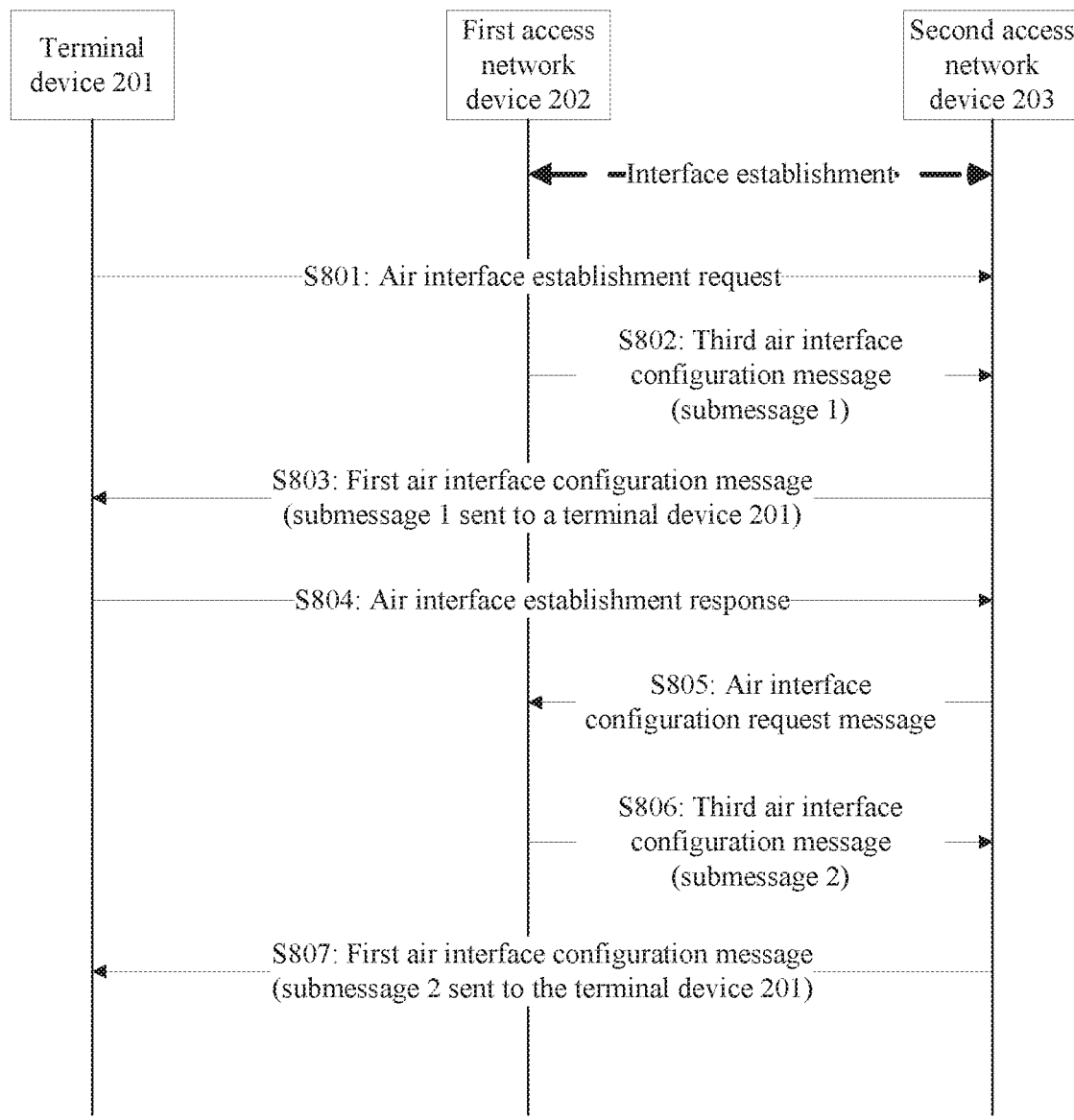
FIG. 8 is a schematic diagram of an air interface configuration procedure according to Embodiment 2 of this application.
Figure 9:
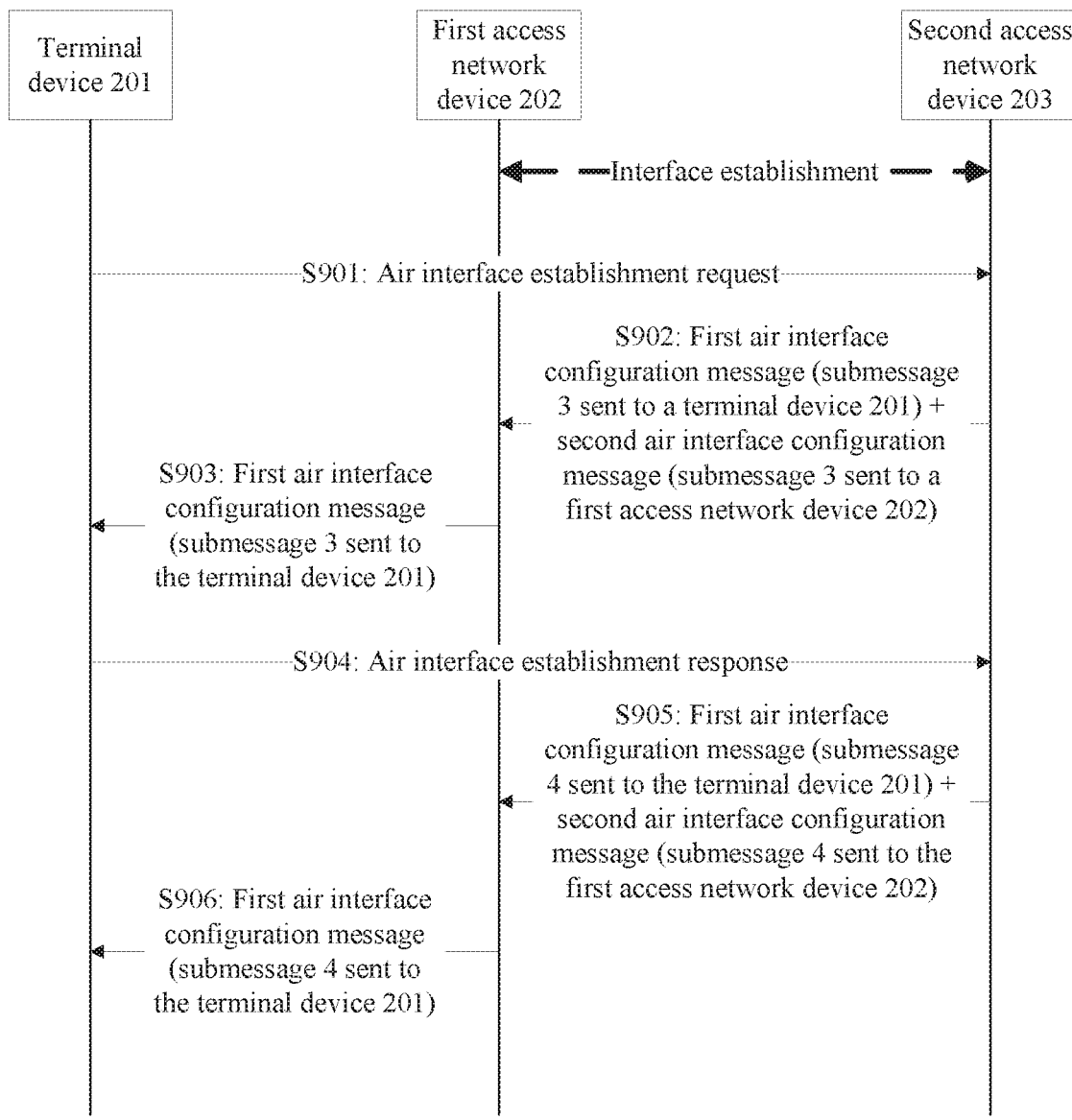
FIG. 9 is a schematic diagram of an air interface configuration procedure according to Embodiment 3 of this application.
Figure 10:
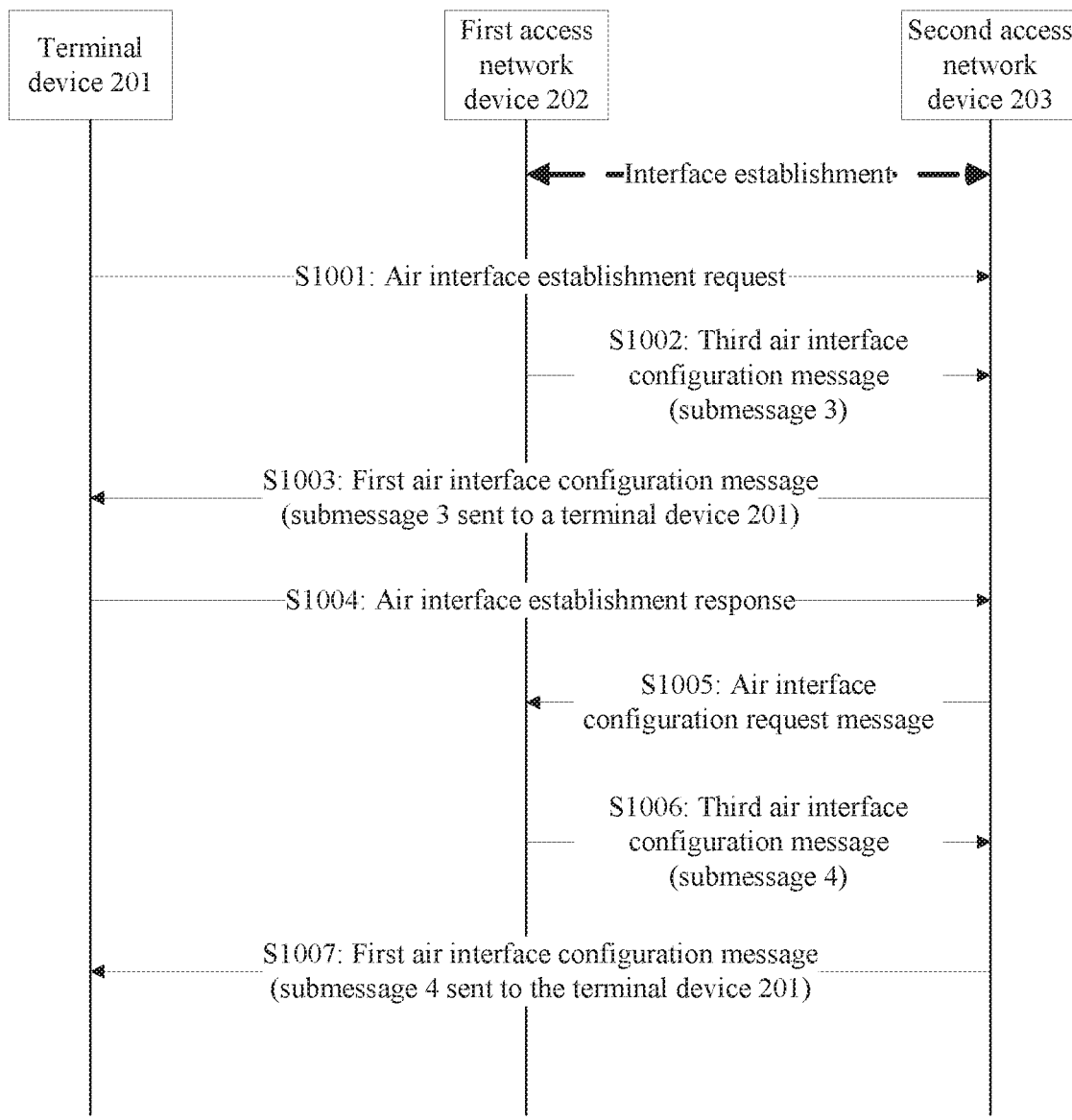
FIG. 10 is a schematic diagram of an air interface configuration procedure according to Embodiment 4 of this application.
Figure 11:
FIG. 11 is a schematic structural diagram of a second access network device according to Embodiment 5.
Figure 12:
FIG. 12 is a schematic structural diagram of an optional implementation of the second access network device provided in Embodiment 5.
Figure 13:
FIG. 13 is a schematic structural diagram of a first access network device according to Embodiment 6.
Figure 14:
FIG. 14 is a schematic structural diagram of an optional implementation of the first access network device provided in Embodiment 6.
Figure 15:
FIG. 15 is a schematic structural diagram of a terminal device according to Embodiment 7.
Figure 16:
FIG. 16 is a schematic structural diagram of an optional implementation of the terminal device provided in Embodiment 7.
Figure 17:
FIG. 17 is a schematic structural diagram of a second access network device according to Embodiment 8.
Figure 18:
FIG. 18 is a schematic structural diagram of an optional implementation of the second access network device provided in Embodiment 8.
Figure 19:
FIG. 19 is a schematic structural diagram of a first access network device according to Embodiment 9.
Figure 20:
FIG. 20 is a schematic structural diagram of an optional implementation of the first access network device provided in Embodiment 9.
Figure 21:
FIG. 21 is a schematic structural diagram of a terminal device according to Embodiment 10.
Figure 22:
FIG. 22 is a schematic structural diagram of an optional implementation of the terminal device provided in Embodiment 10.

| Embodiment | Main content | Accompanying drawing |
|---|---|---|
| Embodiment 1 | The terminal device 201 establishes an air interface connection only to the first access network device 202, and the second access network device 203 configures an air interface between the first access network device 202 and the terminal device 201. | FIG. 7 |
| Embodiment 2 | The terminal device 201 establishes an air interface connection only to the first access network device 202, and the first access network device 202 configures an air interface between the first access network device 202 and the terminal device 201. | FIG. 8 |
| Embodiment 3 | The terminal device 201 establishes an air interface connection to both the first access network device 202 and the second access network device 203, and the second access network device 203 configures an air interface between the first access network device 202 and the terminal device 201. | FIG. 9 |
| Embodiment 4 | The terminal device 201 establishes an air interface connection to both the first access network device 202 and the second access network device 203, and the first access network device 202 configures an air interface between the first access network device 202 and the terminal device 201. | FIG. 10 |
| Embodiment 5 | First type of second access network device | FIG. 11 and FIG. 12 |
| Embodiment 6 | First type of first access network device | FIG. 13 and FIG. 14 |
| Embodiment 7 | First type of terminal device | FIG. 15 and FIG. 16 |
| Embodiment 8 | Second type of second access network device | FIG. 17 and FIG. 18 |
| Embodiment 9 | Second type of first access network device | FIG. 19 and FIG. 20 |
| Embodiment 10 | Second type of terminal device | FIG. 21 and FIG. 22 |

Embodiment 1

Embodiment 1 provides a solution for establishing an air interface connection between a terminal device 201 and a first access network device 202. The first access network device 202 cannot provide a complete air interface protocol stack, and needs to provide a complete air interface protocol stack to the terminal device 201 together with a second access network device 203.

Embodiment 1 may be applicable to protocol stack structures shown in FIG. 3A to FIG. 3D. Certainly, the protocol stack structures shown in FIG. 3A to FIG. 3D are only examples. Actually, Embodiment 1 is applicable to any case in which two access network devices jointly provide a complete air interface protocol stack.

In Embodiment 1, a procedure in which the terminal device 201 interacts with the first access network device 202 and the second access network device 203 is shown in FIG. 7. The procedure includes the following steps.

S701: The terminal device 201 sends an air interface establishment request message to the second access network device 203 by using the first access network device 202, where the air interface establishment request message is a message of an air interface protocol layer that is in a second air interface protocol layer between the terminal device 201 and the second access network device 203 and that is used to configure an air interface; for example, if the second access network device 203 is an LTE base station, the message may be the RRC connection request message mentioned above.

After receiving the air interface establishment request message from the terminal device 201, the first access network device 202 forwards the air interface establishment request message to the second access network device 203 over an interface, for example, an X5 interface, that has been established between the first access network device 202 and the second access network device 203.

S702: After receiving the air interface establishment request message from the terminal device 201, the second access network device 203 may send a submessage 1 of a first air interface configuration message to the first access network device 202, where the submessage 1 is sent to the terminal device 201; after the terminal device 201 receives the message, may configure a first air interface protocol layer between the terminal device 201 and the first access network device 202 and a second air interface protocol layer between the terminal device 201 and the second access network device 203 according to configuration information in the message.

In Embodiment 1 and Embodiment 2, an air interface configuration message sent to the terminal device 201 by the second access network device 203 by using the first access network device 202 is referred to as a "first air interface configuration message". A submessage 1 in the first air interface configuration message and a submessage 2 in the first air interface configuration message are used to jointly complete air interface configuration for the terminal device 201. For example, the submessage 1 is used to configure the SRB 1 mentioned above, and the submessage 2 is used to configure the SRB 2 and the DRB that are mentioned above.

In step S702, the second access network device 203 further sends a submessage 1 of a second air interface configuration message to the first access network device 202, where the submessage 1 is sent to the first access network device 202; after receiving the submessage 1, the first access network device 202 may configure the first air interface protocol layer between the first access network device 202 and the terminal device 201 according to configuration information in the message.

In Embodiment 1 and Embodiment 2, an air interface configuration message sent to the first access network device 202 by the second access network device 203 is referred to as a "second air interface configuration message". A submessage 1 and a submessage 2 that are in the second air interface configuration message are used to jointly complete air interface configuration performed by the first access network device 202. The submessage 1 is used to configure a first air interface protocol layer of the SRB 1 mentioned above, and the submessage 2 is used to configure a first air interface protocol layer of the SRB 2 and the DRB that are mentioned above.

The submessage 1 of the first air interface configuration message and the submessage 1 of the second air interface configuration message may be sent to the first access network device 202 by using a same message, for example, sent by using a same X5 interface message, or separately sent to the first access network device 202 and the terminal device 201 by using independent messages.

The second access network device 203 may add, to a message of an interface between the second access network device 203 and the first access network device 202, the submessage 1 of the first air interface configuration message to be sent to the terminal device 201, and send the interface message to the first access network device 202. If the second access network device 203 is an LTE base station, the submessage 1 may be an RRC connection setup message.

In step S702, if an air interface configuration manner in a current LTE system is used, the submessage 1 of the first air interface configuration message may include configuration information of an SRB 1, for example, the SRB ID, the RLC configuration information, and the LCH configuration information that are mentioned above, and configuration information of a MAC layer and a PHY layer.

According to regulations in the current $3^{rd}$ Generation Partnership Project (3GPP) technical specification (TS) 36.331, RadioResourceConfigDedicated may include configuration information of a MAC layer and a PHY layer, and an SRB-ToAddModList, and an DRB-ToAddModList, There may be a plurality of SRBs.

Certainly, the RRC connection setup message is only an example. The submessage 1 of the first air interface configuration message may also be sent by using another message format.

The submessage 1 of the second air interface configuration message received by the first access network device 202 and the submessage 1 of the first air interface configuration message to be sent to the terminal device 201 by the second access network device 203 may have a same format. However, the first access network device 202 does not need to configure a complete air interface protocol stack. Therefore, the first access network device 202 may extract, from the submessage 1 of the second air interface configuration message, configuration information related to the first air interface protocol layer, and configure the first air interface protocol layer according to the extracted configuration information.

Alternatively, the second access network device 203 may add, to the submessage 1 of the second air interface configuration message, only configuration information related to the first air interface protocol layer, and send the submessage 1 to the first access network device 202. The first access network device 202 configures the first air interface protocol layer according to the received configuration information.

S703: The first access network device 202 sends the submessage 1 of the first air interface configuration message to the terminal device 201, and after receiving the submessage 1 of the first air interface configuration message, the terminal device 201 may perform air interface configuration.

S704: After completing configuration according to the received submessage 1 of the first air interface configuration message, the terminal device 201 may send an air interface establishment response message to the second access network device 203 by using the first access network device 202, where if the second access network device 203 is an LTE base station, the message may be the RRC connection setup complete message mentioned above.

Optionally, a processing manner in the current LTE system may be used, and the terminal device 201 adds an NAS message, for example, a service request message, to the air interface establishment response message.

After receiving the air interface establishment response message from the terminal device 201, the second access network device 203 obtains the service request message from the air interface establishment response message, and may add the obtained service request message to an initial UE message that is to be sent to an MME. The MME sends an initial context setup request message to the second access network device 203. The initial context setup request message includes the aforementioned information required for configuring a DRB for the terminal device 201 by the second access network device 203, for example, a UE AMBR or E-RAB QoS.

If the second access network device 203 is an LTE base station, for a manner of interacting between the LTE base station and the MME, refer to a manner in the current LTE system. The manner may include authentication, NAS security activation, location update, session establishment, access stratum (AS) security activation, and the like. After security is activated, the second access network device 203 may initiate establishment of an SRB 2 link for subsequent transmission of NAS signaling.

S705: The second access network device 203 sends a submessage 2 of the first air interface configuration message to the first access network device 202, where the submessage 2 is sent to the terminal device 201; subsequently, in step S706, after the terminal device 201 receives the message, may configure the first air interface protocol layer between the terminal device 201 and the first access network device 202 and the second air interface protocol layer between the terminal device 201 and the second access network device 203 according to configuration information in the message.

In step S705, the second access network device 203 may further send the submessage 2 of the second air interface configuration message to the first access network device 202, where the submessage 2 is sent to the first access network device 202; after receiving the submessage 2, the first access network device 202 may configure the first air interface protocol layer between the first access network device 202 and the terminal device 201 according to configuration information in the message.

The submessage 2 of the first air interface configuration message and the submessage 2 of the second air interface configuration message may be sent to the first access network device 202 by using a same message, for example, sent by using a same X5 interface message, or separately sent to the first access network device 202 and the terminal device 201 by using independent messages.

In step S705, if the air interface configuration manner in the current LTE system is used, the submessage 2 of the first air interface configuration message may include configuration information of an SRB 2 and a DRB.

For example, the DRB configuration information may include RLC configuration information, an LCH ID, LCH configuration information, configuration information of a. MAC layer and a PITY layer, and the like. DRB configuration information of the second air interface protocol layer between the terminal device 201 and the second access network device 203 may include an EPS bearer ID, a DRB ID, PDCP configuration information, and the like.

For example, the SRB 2 configuration information may include SRB ID, RLC configuration information, LCH configuration information, and configuration information of a MAC layer and a PHY layer.

The configuration information of a MAC layer and a PHY layer of the DRB is the same as or different from that of the SRB 2.

Certainly, an RRC connection reconfiguration message is only an example. The submessage 2 of the first air interface configuration message may also be sent by using another message format.

The submessage 2 of the second air interface configuration message received by the first access network device 202 and the submessage 2 of the first air interface configuration message to be sent to the terminal device 201 by the second access network device 203 may have a same format. However, the first access network device 202 does not need to configure a complete air interface protocol stack. Therefore, the first access network device 202 may extract, from the submessage 2 of the second air interface configuration message, configuration information related to the first air interface protocol layer, and configure the first air interface protocol layer according to the extracted configuration information.

Alternatively, the second access network device 203 may add, to the submessage 2 of the second air interface configuration message, only configuration information related to the first air interface protocol layer, and send the submessage 2 to the first access network device 202. The first access network device 202 configures the first air interface protocol layer according to the received configuration information.

Embodiment 1 is described above, in Embodiment 1, the first access network device 202 configures an air interface between the first access network device 202 and the terminal device 201 according to the second air interface configuration message received from the second access network device 203. Different from that in Embodiment 1, in Embodiment 2, the first access network device 202 determines configuration information of a first air interface protocol layer between the first access network device 202 and the terminal device 201, and sends the determined configuration information of the first air interface protocol layer to the second access network device 203 by using a third air interface configuration message; in a first air interface configuration message sent to the terminal device 201 by the second access network device 203, the configuration information of the first air interface protocol layer is sent to the terminal device 201 by the second access network device 203 after being obtained from the third air interface configuration message sent by the first access network device 202.

Embodiment 2

Embodiment 2 provides a solution for establishing an air interface connection between a terminal device 201 and a first access network device 202. The first access network device 202 cannot provide a complete air interface protocol stack, and needs to provide a complete air interface protocol stack to the terminal device 201 together with a second access network device 203.

Embodiment 2 may be applicable to protocol stack structures shown in FIG. 3A to FIG. 3D. Certainly, the protocol stack structures shown in FIG. 3A to FIG. 3D are only examples. Actually, Embodiment 2 is applicable to any case in which two access network devices jointly provide a complete air interface protocol stack.

In Embodiment 2, a procedure in which the terminal device 201 interacts with the first access network device 202 and the second access network device 203 is shown in FIG. 8. The procedure includes the following steps.

S801: The terminal device 201 sends an air interface establishment request message to the second access network device 203 by using the first access network device 202, where for specific implementation of the air interface establishment request message, refer to step S701.

After receiving the air interface establishment request message from the terminal device 201, the first access network device 202 forwards the air interface establishment request message to the second access network device 203 over an interface, for example, an X5 interface, that has been established between the first access network device 202 and the second access network device 203.

S802: The first access network device 202 determines configuration information of a first air interface protocol layer between the first access network device 202 and the terminal device 201, and sends a submessage 1 of a third air interface configuration message to the second access network device 203, where the submessage 1 carries the determined configuration information of the first air interface protocol layer.

In Embodiment 2, an air interface configuration message sent to the second access network device 203 by the first access network device 202 is referred to as a "third air interface configuration message". A submessage 1 and a submessage 2 that are in the third air interface configuration message together include complete air interface configuration information from the first access network device 202. For example, the submessage 1 includes configuration information of a first air interface protocol layer of an SRB 1, and the submessage 2 includes configuration information of a first air interface protocol layer of an SRB 2 and a DRB.

The submessage 1 of the third air interface configuration message and the air interface establishment request in step S801 may be sent to the second access network device 203 together, for example, sent by using a same X5 interface message, or separately sent to the second access network device 203 by using independent messages.

In step S802, if an air interface configuration manner in a current LTE system is used, the submessage 1 of the third air interface configuration message may include configuration information of a first air interface protocol layer of an SRB 1. The message may be sent to the second access network device 203 by using a container form, and the second access network device 203 cannot read the message, and directly copies the message into a submessage 1 of a first air interface configuration message that is to be sent to the terminal device 201 subsequently. Alternatively, the message may be sent by using a non-container form, and the second access network device 203 can read content in the message.

Optionally, the first access network device 202 may configure the first air interface protocol layer after determining the configuration information of the first air interface protocol layer between the first access network device 202 and the terminal device 201, or may configure the first air interface protocol layer after receiving a first air interface configuration message from the second access network device 203 in step S803.

S803: The second access network device 203 sends a submessage 1 of a first air interface configuration message to the first access network device 202 over an interface between the second access network device 203 and the first access network device 202, and after receiving the submessage 1, the first access network device 202 forwards the submessage 1 to the terminal device 201.

For a sending manner and message content that are of the submessage 1 of the first air interface configuration message, refer to the description of Embodiment 1. Details are not repeated herein any further.

After receiving the submessage 1 of the first air interface configuration message, the terminal device 201 may perform air interface configuration.

S804: After completing configuration according to the received submessage 1 of the first air interface configuration message, the terminal device 201 may send an air interface establishment response message to the second access network device 203 by using the first access network device 202.

For specific implementation of the air interface establishment response message and content included in the message, refer to the description of step S704.

If the air interface establishment response message includes a service request message, after receiving the air interface establishment response message from the terminal device 201, the second access network device 203 obtains the service request message from the air interface establishment response message, and may add the obtained service request message to an initial UE message that is to be sent to an MME. The MME sends an initial context setup request message to the second access network device 203. The initial context setup request message includes the aforementioned information required for configuring a DRB for the terminal device 201 by the second access network device 203, for example, a UE AMBR or E-RAB QoS.

For a manner of interacting between the second access network device 203 and the MME, refer to the description of step S704.

S805: The second access network device 203 sends an air interface configuration request message to the first access network device 202.

The second access network device 203 may add information to the message. A manner of adding the information includes but is not limited to the following two manners:

Manner 1:

The air interface configuration request message carries context information of the terminal device 201. For example, if a manner used when an LTE base station in an UT system sets an RRC reconfiguration message is used, the second access network device 203 may send the following information to the first access network device 202: an AMBR, E-RAB QoS, and the like of the terminal device 201. After receiving the information, the first access network device 202 determines, according to the message, configuration information of a first air interface protocol layer of a user plane between the first access network device 202 and the terminal device 201, that is, determines configuration information of a first air interface protocol layer of a DRB.

Manner 2:

The air interface configuration message carries configuration information of a second air interface protocol layer between the second access network device 203 and the terminal device 201, for example, configuration information of a second air interface protocol layer of a DRB, for example, an EPS bearer ID, a DRB ID, or PDCP configuration information. After receiving the information, the first access network device 202 determines configuration information of a first air interface protocol layer of a DRB between the first access network device 202 and the terminal device 201, for example, make an LCH ID correspond to the DRB ID.

In addition, the first access network device 202 may further determine a configuration parameter of a first air interface protocol layer of an SRB 2 between the first access network device 202 and the terminal device 201.

S806: The first access network device 202 sends a submessage 2 of the third air interface configuration message to the second access network device 203, where the submessage 2 includes configuration information that is of a first air interface protocol layer and that is determined in step S805, for example, a configuration parameter of a first air interface protocol layer of an SRB 2 and a DRB.

S807: The second access network device 203 sends a submessage 2 of the first air interface configuration message to the terminal device 201 by using the first access network device 202, where the submessage is sent to the terminal device 201, and after receiving the submessage 2, the terminal device 201 configures an air interface according to configuration information in the message.

For a sending manner and message content that are of the submessage 2 of the first air interface configuration message, refer to the description of Embodiment 1. Details are not repeated herein any further.

Optionally, the first access network device 202 may configure the first air interface protocol layer after determining, in step S806, the configuration information of the first air interface protocol layer between the first access network device 202 and the terminal device 201, or may configure the first air interface protocol layer after receiving the first air interface configuration message from the second access network device 203 in step S807.

Embodiment 1 and Embodiment 2 are described above. The two embodiments are applicable to a case shown in FIG. 2A, that is, the terminal device 201 establishes an air interface connection only to the first access network device 202, and the terminal device 201 may be connected to a core network by using the first access network device 202 and the second access network device 203. Therefore, in Embodiment 1 and Embodiment 2, during air interface configuration, only the first air interface protocol layer between the terminal device 201 and the first access network device 202 and the second air interface protocol layer between the terminal device 201 and the second access network device 203 need to be configured.

Embodiment 3 and Embodiment 4 are described in the following. Embodiment 3 and Embodiment 4 are different from the foregoing two embodiments in the following: Embodiment 3 and Embodiment 4 are applicable to a case shown in FIG. 2B, that is, the terminal device 201 not only establishes an air interface connection of a first air interface to the first access network device 202, but also establishes an air interface connection of a second air interface to the second access network device 203. In Embodiment 3 and Embodiment 4, during air interface configuration, not only each air interface protocol layer of the first air interface between the terminal device 201 and the first access network device 202 needs to be configured, but also an air interface protocol layer of the second air interface between the terminal device 201 and the second access network device 203 needs to be configured.

Embodiment 3

Embodiment 3 provides a solution for establishing an air interface connection between a terminal device 201 and a first access network device 202 and between the terminal device 201 and a second access network device 203. On a first air interface between the terminal device 201 and the first access network device 202, the first access network device 202 cannot provide a complete air interface protocol stack, and needs to provide a complete air interface protocol stack to the terminal device 201 together with the second access network device 203.

Embodiment 3 may be applicable to protocol stack structures shown in FIG. 4A to FIG. 4D. Certainly, the protocol stack structures shown in FIG. 4A to FIG. 4D are only examples. Actually, Embodiment 3 is applicable to any case in which two access network devices jointly provide a complete air interface protocol stack of an air interface, and another access network device provides a complete air interface protocol stack.

In Embodiment 3, a procedure in which the terminal device 201 interacts with the first access network device 202 and the second access network device 203 is shown in FIG. 9. The procedure includes the following steps.

S901: The terminal device 201 sends an air interface establishment request message to the second access network device 203 by using the first access network device 202, where for an optional implementation of the air interface establishment request message, refer to the description of step S701.

After receiving the air interface establishment request message from the terminal device 201, the first access network device 202 forwards the air interface establishment request message to the second access network device 203 over an interface, for example, an X5 interface, that has been established between the first access network device 202 and the second access network device 203.

S902: After receiving the air interface establishment request message from the terminal device 201, the second access network device 203 may send a submessage 3 of a first air interface configuration message to the first access network device 202, where the submessage 3 is sent to the terminal device 201 and includes configuration information of a first air interface and a second air interface, after receiving the message, the terminal device 201 may configure the first air interface between the terminal device 201 and the first access network device 202 and the second air interface between the terminal device 201 and the second access network device 203 according to the configuration information in the message.

In Embodiment 3 and Embodiment 4, an air interface configuration message sent to the terminal device 201 by the second access network device 203 by using the first access network device 202 is referred to as a "first air interface configuration message". A submessage 3 in the first air interface configuration message and a submessage 4 in the first air interface configuration message are used to jointly complete air interface configuration for the terminal device 201. For example, the submessage 3 is used to configure an SRB 1 of the first air interface and an SRB 1 of the second air interface, and the submessage 4 is used to configure an SRB 2 and a DRB that are of the first air interface and the second air interface.

In step S902, the second access network device 203 further sends a submessage 3 of a second air interface configuration message to the first access network device 202, where the submessage 3 is sent to the first access network device 202. After receiving the submessage 3, the first access network device 202 may configure a first air interface protocol layer between the first access network device 202 and the terminal device 201 according to configuration information in the message.

In Embodiment 3 and Embodiment 4, an air interface configuration message sent to the first access network device 202 by the second access network device 203 is referred to as a "second air interface configuration message". A submessage 3 and a submessage 4 that are in the second air interface configuration message are used to jointly complete air interface configuration performed by the first access network device 202. The submessage 3 is used to configure a first air interface protocol layer of the SRB 1 mentioned above, and the submessage 4 is used to configure a first air interface protocol layer of the SRB 2, and the DRB that are mentioned above.

The submessage 3 of the first air interface configuration message and the submessage 3 of the second air interface configuration message may be sent to the first access network device 202 by using a same message, for example, sent by using a same X5 interface message, or separately sent to the first access network device 202 and the terminal device 201 by using independent messages.

The second access network device 203 may add, to a message of an interface between the second access network device 203 and the first access network device 202, the submessage 3 of the first air interface configuration message to be sent to the terminal device 201, and send the interface message to the first access network device 202. If the second access network device 203 is an LTE base station, the submessage 3 may be an RRC connection setup message.

For the configuration information of the first air interface in the submessage 3 of the first air interface configuration message, refer to the aforementioned submessage 1 in the first air interface configuration message in Embodiment 1.

In step S902, if an air interface configuration manner in a current LTE system is used, the submessage 3 of the first air interface configuration message may include configuration information of an SRB 1, for example, the SRB ID, the RLC configuration information, and the LCH configuration information that are mentioned above, and configuration information of a MAC layer and a PHY layer.

Certainly, the RRC connection setup message is only an example. The submessage 3 of the first air interface configuration message may also be sent by using another message format.

S903: The first access network device 202 sends the submessage 3 of the first air interface configuration message to the terminal device 201, and after receiving the submessage 3 of the first air interface configuration message, the terminal device 201 may perform air interface configuration, that is, configure the first air interface and the second air interface.

S904: After completing configuration according to the received submessage 3 of the first air interface configuration message, the terminal device 201 may send an air interface establishment response message to the second access network device 203 by using the first access network device 202, where if the second access network device 203 is an LTE base station, the message may be the RRC connection setup complete message mentioned above.

Alternatively, because the SRB 1 of the second air interface between the terminal device 201 and the second access network device 203 is also established, the terminal device 201 may send an air interface establishment response to the second access network device 203 directly over the second air interface.

Optionally, a processing manner in the current LTE system may be used, and the terminal device 201 adds an NAS message, for example, a service request message, to the air interface establishment response message.

After receiving the air interface establishment response message from the terminal device 201, the second access network device 203 obtains the service request message from the air interface establishment response message, and may add the obtained service request message to an initial UE message that is to be sent to an MME. The MME sends an initial context setup request message to the second access network device 203. The initial context setup request message includes the aforementioned information required for configuring a DRB for the terminal device 201 by the second access network device 203, for example, a UE AMBR or E-RAB QoS.

In addition, the initial context setup request message may further include capability information of the terminal device 201. As mentioned above, the terminal device 201 may communicate with the first access network device 202 and the second access network device 203 in a DC manner or a CA manner. Herein, the capability information of the terminal device 201 may be used to indicate whether the terminal device 201 supports both the DC manner and the CA manner.

If the second access network device 203 is an LTE base station, for a manner of interacting between the LTE base station and the MME, refer to a manner in the current LTE system. The manner may include authentication, NAS security activation, location update, session establishment, AS security activation, and the like. After security is activated, the second access network device 203 may initiate establishment of an SRB 2 link for subsequent transmission of NAS signaling.

Optionally, if the terminal device 201 supports both the DC manner and the CA manner, the second access network device 203 may send a measurement configuration to the terminal device 201 by using the first access network device 202, and then, the terminal device 201 may send a measurement result to the second access network device 203 by using the first access network device 202. The second access network device 203 may select, for the terminal device 201 according to the received measurement result and a known status of a cell managed by the second access network device 203, a proper cell for access.

S905: The second access network device 203 sends a submessage 4 of the first air interface configuration message to the first access network device 202, where the submessage 4 is sent to the terminal device 201 and includes the configuration information of the first air interface and the second air interface; after receiving the message, the terminal device 201 may configure the first air interface between the terminal device 201 and the first access network device 202 and the second air interface between the terminal device 201 and the second access network device 203 according to the configuration information in the message.

In step S905, the second access network device 203 may further send the submessage 4 of the second air interface configuration message to the first access network device 202, where the submessage 4 is sent to the first access network device 202, and includes configuration information of the first air interface protocol layer of the first air interface between the first access network device 202 and the terminal device 201; after receiving the submessage 4, the first access network device 202 may configure the first air interface protocol layer of the first air interface according to the configuration information in the message.

The submessage 4 of the first air interface configuration message and the submessage 4 of the second air interface configuration message may be sent to the first access network device 202 by using a same message, for example, sent by using a same X5 interface message, or separately sent to the first access network device 202 and the terminal device 201 by using independent messages.

In step S905, if the air interface configuration manner in the current LTE system is used, the submessage 4 of the first air interface configuration message may include configuration information of an SRB 2 and a DRB.

For example, the DRB configuration information may include RLC configuration information, an LCH ID, LCH configuration information, configuration information of a MAC layer and a PRY layer, and the like. DRB configuration information of a second air interface protocol layer or a fourth air interface protocol layer between the terminal device 201 and the second access network device 203 may include an EPS bearer ID, a DRB ID, PDCP configuration information, and the like.

For example, the SRB 2 configuration information may include an SRB ID, RLC configuration information, LCH configuration information, and configuration information of a MAC layer and a PHY layer.

The configuration information of a MAC layer and a PHY layer of the DRB is the same as or different from that of the SRB 2.

Certainly, an RRC connection reconfiguration message is only an example. The submessage 4 of the first air interface configuration message may also be sent by using another message format.

If the first access network device 202 and the second access network device 203 are co-located with same coverage, after configuring the second air interface, the terminal device 201 may transmit data and an NAS message directly over the second air interface.

If the first access network device 202 and the second access network device 203 do not have same coverage, an optional implementation is that the terminal device 201 can transmit data and an NAS message over the second air interface only after performing random access over the second air interface. Therefore, in this case, in addition to the foregoing information, the submessage 4 of the first air interface configuration message may include access information, and the terminal device 201 may access, according to the access information, a cell managed by the second access network device 203. In addition, the message may include cell information of the cell that is managed by the second access network device 203 and that the terminal device 201 can access. Certainly, the access information and the cell information may alternatively be carried in a subsequent air interface configuration message, for example, an RRC message.

Embodiment 3 is described above. In Embodiment 3, the first access network device 202 configures the first air interface between the first access network device 202 and the terminal device 201 according to the second air interface configuration message received from the second access network device 203. Different from that in Embodiment 3, in Embodiment 4, the first access network device 202 determines configuration information of a first air interface protocol layer of a first air interface between the first access network device 202 and the terminal device 201, and sends the determined configuration information of the first air interface protocol layer of the first air interface to the second access network device 203 by using a third air interface configuration message in a first air interface configuration message sent to the terminal device 201 by the second access network device 203, the configuration information of the first air interface protocol layer of the first air interface is sent to the terminal device 201 after being obtained by the second access network device 203 from the third air interface configuration message sent by the first access network device 202.

Embodiment 4

Embodiment 4 provides a solution for establishing an air interface connection between a terminal device 201 and a first access network device 202 and between the terminal device 201 and a second access network device 203. On a first air interface between the terminal device 201 and the first access network device 202, the first access network device 202 cannot provide a complete air interface protocol stack, and needs to provide a complete air interface protocol stack to the terminal device 201 together with the second access network device 203.

Embodiment 4 may be applicable to protocol stack structures shown in FIG. 4A to FIG. 4D. Certainly, the protocol stack structures shown in FIG. 4A to FIG. 4D are only examples. Actually, Embodiment 4 is applicable to any case in which two access network devices jointly provide a complete air interface protocol stack of an air interface, and another access network device provides a complete air interface protocol stack.

In Embodiment 4, a procedure in which the terminal device 201 interacts with the first access network device 202 and the second access network device 203 is shown in FIG. 10. The procedure includes the following steps.

S1001: The terminal device 201 sends an air interface establishment request message to the second access network device 203 by using the first access network device 202, where for an optional implementation of the air interface establishment request message, refer to the description of step S701.

After receiving the air interface establishment request message from the terminal device 201, the first access network device 202 forwards the air interface establishment request message to the second access network device 203 over an interface, for example, an X5 interface, that has been established between the first access network device 202 and the second access network device 203.

S1002: The first access network device 202 determines configuration information of a first air interface protocol layer of a first air interface between the first access network device 202 and the terminal device 201, and sends a submessage 3 of a third air interface configuration message to the second access network device 203, where the submessage 3 carries the determined configuration information of the first air interface protocol layer of the first air interface.

In Embodiment 4, an air interface configuration message sent to the second access network device 203 by the first access network device 202 is referred to as a "third air interface configuration message". A submessage 3 and a submessage 4 that are in the third air interface configuration message together include complete air interface configuration information from the first access network device 202. For example, the submessage 3 includes configuration information of a first air interface protocol layer of an SRB 1, where the SRB 1 is of the first air interface, and the submessage 4 includes configuration information of a first air interface protocol layer of an SRB 2 and a DRB, where the SRB 2 and the DRB are of the first air interface.

The submessage 3 of the third air interface configuration message and the air interface establishment request in step S1001 may be sent to the second access network device 203 together, for example, sent by using a same X5 interface message, or separately sent to the second access network device 203 by using independent messages.

In step S1002, if an air interface configuration manner in a current LTE system is used the submessage 3 of the third air interface configuration message may include configuration information of a first air interface protocol layer of an SRB 1, where the SRB 1 is of the first air interface. The message may be sent to the second access network device 203 by using a container form, and the second access network device 203 cannot read the message, and directly copies the message into a submessage 3 of a first air interface configuration message that is to be sent to the terminal device 201 subsequently. Alternatively, the message may be sent by using a non-container form, and the second access network device 203 can read content in the message.

Optionally, the first access network device 202 may configure the first air interface protocol layer after determining the configuration information of the first air interface protocol layer of the first air interface between the first access network device 202 and the terminal device 201, or may configure the first air interface protocol layer after receiving a first air interface configuration message from the second access network device 203 in step S1003.

S1003: The second access network device 203 sends a submessage 3 of a first air interface configuration message to the first access network device 202 over an interface between the second access network device 203 and the first access network device 202, and after receiving the submessage 3, the first access network device 202 forwards the submessage 3 to the terminal device 201.

For a sending manner and message content that are of the submessage 3 of the first air interface configuration message, refer to the description of Embodiment 3. Details are not repeated herein any further.

After receiving the submessage 3 of the first air interface configuration message, the terminal device 201 may configure the first air interface and a second air interface.

S1004: After completing configuration according to the received submessage 3 of the first air interface configuration message, the terminal device 201 may send an air interface establishment response message to the second access network device 203 by using the first access network device 202, where for an optional implementation of the air interface establishment response message, refer to step S904.

Alternatively, because an SRB 1 of the second air interface between the terminal device 201 and the second access network device 203 is also established, the terminal device 201 may send an air interface establishment response to the second access network device 203 directly over the second air interface.

Optionally, a processing manner in the current LTE system may be used, and the terminal device 201 adds an NAS message, for example, a service request message, to the air interface establishment response message.

After receiving the air interface establishment response message from the terminal device 201, the second access network device 203 obtains the service request message from the air interface establishment response message, and may add the obtained service request message to an initial UE message that is to be sent to an MME. The MME sends an initial context setup request message to the second access network device 203. The initial context setup request message includes the aforementioned information required for configuring a DRB for the terminal device 201 by the second access network device 203, for example, a UE AMBR or E-RAB QoS.

In addition, the initial context setup request message may further include capability information of the terminal device 201. As mentioned above, the terminal device 201 may communicate with the first access network device 202 and the second access network device 203 in a DC manner or a CA manner. Herein, the capability information of the terminal device 201 may be used to indicate whether the terminal device 201 supports both the DC manner and the CA manner.

If the second access network device 203 is an LTE base station, for a manner of interacting between the LTE base station and the MME, refer to a manner in the current LTE system. The manner may include authentication, NAS security activation, location update, session establishment, AS security activation, and the like. After security is activated, the second access network device 203 may initiate establishment of an SRB 2 link for subsequent transmission of NAS signaling.

Optionally, if the terminal device 201 supports both the DC manner and the CA manner, the second access network device 203 may send a measurement configuration to the terminal device 201 by using the first access network device 202, and then, the terminal device 201 may send a measurement result to the second access network device 203 by using the first access network device 202. The second access network device 203 may select, for the terminal device 201 according to the received measurement result and a known status of a cell managed by the second access network device 203, a proper cell for access.

S1005: The second access network device 203 sends an air interface configuration request message to the first access network device 202.

For a manner of carrying information by the air interface configuration request message, refer to step S805.

In addition, the first access network device 202 may further determine a configuration parameter of a first air interface protocol layer of an SRB 2 between the first access network device 202 and the terminal device 201.

S1006: The first access network device 202 sends a submessage 4 of the third air interface configuration message to the second access network device 203, where the submessage 4 includes the configuration information that is of the first air interface protocol layer of the first air interface and that is determined in step S1002, for example, a configuration parameter of a first air interface protocol layer of an SRB 2 and a DRB, where the SRB 2 and the DRB are of the first air interface.

S1007: The second access network device 203 sends a submessage 4 of the first air interface configuration message to the first access network device 202, where the submessage 4 is sent to the terminal device 201 and includes configuration information of the first air interface and a second air interface; after receiving the message, the terminal device 201 may configure the first air interface between the terminal device 201 and the first access network device 202 and the second air interface between the terminal device 201 and the second access network device 203 according to the configuration information the message.

For content and a sending manner that are of the submessage 4, refer to the related description of step S905.

Embodiment 5

FIG. 11 is a schematic structural diagram of a second access network device according to Embodiment 5. As shown in FIG. 11, the second access network device includes:

a processing module 1101, configured to determine air interface configuration information of an air interface between a terminal device and a radio access network; and a sending module 1102, configured to send a first air interface configuration message including the air interface configuration information to a first access network device in the radio access network, where the first access network device and the second access network device use different wireless communications standards;

the air interface between the terminal device and the radio access network includes a first air interface protocol layer and a second air interface protocol layer; the first air interface protocol layer is between the terminal device and the first access network device, the second air interface protocol layer is between the terminal device and the second access network device, and the second air interface protocol layer is above the first air interface protocol layer; and the first air interface configuration message is a message of an air interface protocol layer that is in the second air interface protocol layer and that is used to configure an air interface.

The second access network device may further include a receiving module, configured to receive a message and/or data that are/is sent by the first access network device.

For another optional implementation of the second access network device, refer to implementation of the second access network device 203 in Embodiment 1 or Embodiment 2. The processing module 1101 may be configured to perform processing and control operations of the second access network device 203. The sending module 1102 may be configured to perform an operation of sending information to the first access network device 202 by the second access network device 203. The receiving module may be configured to perform an operation of receiving information from the first access network device 202 by the second access network device 203.

For a procedure in which the second access network device interacts with the first access network device, refer to the procedure in which the second access network device 203 interacts with the first access network device 202 in the procedure shown in FIG. 7 or FIG. 8. For content and a structure of a message sent or received by the second access network device, also refer to the description of the procedure.

An optional implementation of the second access network device may be shown in FIG. 12. A processor 1201 may be configured to implement a function of the processing module 1101. A transmitter 1202 may be configured to implement a function of the sending module 1102. Optionally, a receiver may further be included, and may be configured to implement a function of the receiving module. In addition, the second access network device may further include a memory, configured to store a program and data. The processor 1201 may perform processing and control by invoking the program stored in the memory.

If the second access network device and the first access network device communicate with each other by means of optical fiber transmission, the transmitter 1202 may be an optical transmitter, and the receiver may be an optical receiver. If the second access network device and the first access network device communicate with each other by means of microwave transmission, the transmitter 1202 may be a microwave transmitter, and the receiver may be a microwave receiver.

In addition, the second access network device may further include a radio frequency transceiver that communicates with the terminal device.

The transmitter 1202, the memory, and the receiver each may be directly connected to the processor 1201. Alternatively, the transmitter 1202, the memory, the receiver, and the processor 1201 each are connected to a bus, and the components communicate with each other by using the bus.

Embodiment 6

FIG. 13 is a schematic structural diagram of a first access network device according to Embodiment 6. As shown in FIG. 13, the first access network device includes:

a receiving module 1301, configured to receive a first air interface configuration message from a second access network device in a radio access network, where the first access network device and the second access network device use different wireless communications standards, and the first air interface configuration message includes air interface configuration information of an air interface between a terminal device and the radio access network; and a first sending module 1302, configured to send the first air interface configuration message to the terminal device, where the air interface between the terminal device and the radio access network includes a first air interface protocol layer and a second air interface protocol layer; the first air interface protocol layer is between the terminal device and the first access network device, the second air interface protocol layer is between the terminal device and the second access network device, and the second air interface protocol layer is above the first air interface protocol layer; and the first air interface configuration message is a message of an air interface protocol layer that is in the second air interface protocol layer and that is used to configure an air interface.

The first access network device may further include a processing module, configured to perform processing and control operations of the first access network device.

For another optional implementation of the first access network device, refer to implementation of the first access network device 202 in Embodiment 1 or Embodiment 2. The processing module may be configured to perform processing and control operations of the first access network device 202. The first sending module 1302 may be configured to perform an operation of sending information to the terminal device 201 by the first access network device 202. The receiving module 1301 may be configured to perform an operation of receiving information from the second access network device 203 by the first access network device 202.

For a procedure in which the first access network device interacts with the second access network device and the terminal device, refer to the procedure in which the first access network device 202 interacts with the second access network device 203 and the terminal device 201 in the procedure shown in FIG. 7 or FIG. 8. For content and a structure of a message sent or received by the first access network device, also refer to the description of the procedure.

An optional implementation of the first access network device may be shown in FIG. 14. A first transmitter 1402 may be configured to implement a function of the first sending module 1302. A receiver 1401 may be configured to implement a function of the receiving module 1301. A processor may further be included, and may be configured to implement a function of the processing module. In addition, the first access network device may further include a memory, configured to store a program and data. The processor may perform processing and control by invoking the program stored in the memory.

The first transmitter 1402 may be a radio frequency transmitter. If the first access network device and the second access network device communicate with each other by means of optical fiber transmission, the receiver 1401 may be an optical receiver. If the first access network device and the second access network device communicate with each other by means of microwave transmission, the receiver 1401 may be a microwave receiver.

In addition, the first access network device may further include a radio frequency receiver receiving a message and/or data that are/is sent by the terminal device, and a second transmitter sending a message and/or data to the second access network device. The second transmitter may be an optical transmitter, a microwave transmitter, or the like.

The first transmitter 1402, the memory, and the receiver 1401 each may be directly connected to the processor. Alternatively, the first transmitter 1402, the memory, the receiver 1401, and the processor each are connected to a bus, and the components communicate with each other by using the bus.

Embodiment 7

FIG. 15 is a schematic structural diagram of a terminal device according to Embodiment 7. As shown in FIG. 15, the terminal device includes:

a receiving module 1501, configured to receive a first air interface configuration message from a first access network device, where the first air interface configuration message is from a second access network device, and is forwarded by the first access network device; the first access network device and the second access network device are located in a same radio access network, the first access network device and the second access network device use different wireless communications standards; and the first air interface configuration message includes air interface configuration information of an air interface between the terminal device and the radio access network; and a processing module 1502, configured to obtain the air interface configuration information from the first air interface configuration message, and configure the air interface between the terminal device and the radio access network according to the air interface configuration information, where the air interface between the terminal device and the radio access network includes a first air interface protocol layer and a second air interface protocol layer; the first air interface protocol layer is between the terminal device and the first access network device, the second air interface protocol layer is between the terminal device and the second access network device, and the second air interface protocol layer is above the first air interface protocol layer; and the first air interface configuration message is a message of an air interface protocol layer that is in the second air interface protocol layer and that is used to configure an air interface.

The terminal device may further include a sending module, configured to send a message and/or data to the first access network device and/or the second access network device.

For another optional implementation of the terminal device, refer to implementation of the terminal device 201 in Embodiment 1 or Embodiment 2. The processing module 1502 may be configured to perform processing and control operations of the terminal device 201. The sending module may be configured to perform an operation of sending information to the first access network device 202 or the second access network device 203 by the terminal device 201. The receiving module 1501 may be configured to perform an operation of receiving information from the second access network device 203 or the first access network device 202 by the terminal device 201.

For a procedure in which the terminal device interacts with the second access network device and the first access network device, refer to the procedure in which the terminal device 201 interacts with the second access network device 203 and the first access network device 202 in the procedure shown in FIG. 7 or FIG. 8. For content and a structure of a message sent or received by the terminal device, also refer to the description of the procedure.

An optional implementation of the terminal device may be shown in FIG. 16. A processor 1602 may be configured to implement a function of the processing module 1502. A receiver 1601 may be configured to implement a function of the receiving module 1501. Optionally, a transmitter may further be included, and may be configured to implement a function of the sending module. In addition, the terminal device may further include a memory, configured to store a program and data. The processor 1602 may perform processing and control by invoking the program stored in the memory.

The transmitter may be a radio frequency transmitter. The receiver 1601 may be a radio frequency receiver.

The transmitter, the memory, and the receiver 1601 each may be directly connected to the processor 1602. Alternatively, the transmitter, the memory, the receiver 1601, and the processor 1602 each are connected to a bus, and the components communicate with each other by using the bus.

Embodiment 8

FIG. 17 is a schematic structural diagram of a second access network device according to Embodiment 8. As shown in FIG. 17, the second access network device includes:

a processing module 1701, configured to determine air interface configuration information of an air interface between a terminal device and a radio access network; and a sending module 1702, configured to send a first air interface configuration message including the air interface configuration information to a first access network device in the radio access network, where the first access network device and the second access network device use different wireless communications standards; the air interface between the terminal device and the radio access network includes a first air interface and a second air interface; the first air interface includes a first air interface protocol layer and a second air interface protocol layer, the first air interface protocol layer is between the terminal device and the first access network device, the second air interface protocol layer is between the terminal device and the second access network device, and the second air interface protocol layer is above the first air interface protocol layer; the second air interface is an air interface between the terminal device and the second access network device; and the first air interface configuration message is a message of an air interface protocol layer that is included in the second air interface and that is used to configure an air interface.

The second access network device may further include a receiving module, configured to receive a message and/or data that are/is sent by the first access network device.

For another optional implementation of the second access network device, refer to implementation of the second access network device 203 in Embodiment 3 or Embodiment 4. The processing module 1701 may be configured to perform processing and control operations of the second access network device 203. The sending module 1702 may be configured to perform an operation of sending information to the first access network device 202 by the second access network device 203. The receiving module may be configured to perform an operation of receiving information from the first access network device 202 by the second access network device 203.

For a procedure in which the second access network device interacts with the first access network device, refer to the procedure in which the second access network device 203 interacts with the first access network device 202 in the procedure shown in FIG. 9 or FIG. 10. For content and a structure of a message sent or received by the second access network device, also refer to the description of the procedure.

An optional implementation of the second access network device may be shown in FIG. 18. A processor 1801 may be configured to implement a function of the processing module 1701. A transmitter 1802 may be configured to implement a function of the sending module 1702. Optionally, a receiver may further be included, and may be configured to implement a function of the receiving module. In addition, the second access network device may further include a memory, configured to store a program and data. The processor 1801 may perform processing and control by invoking the program stored in the memory.

If the second access network device and the first access network device communicate with each other by means of optical fiber transmission, the transmitter 1802 may be an optical transmitter, and the receiver may be an optical receiver. If the second access network device and the first access network device communicate with each other by means of microwave transmission, the transmitter 1802 may be a microwave transmitter, and the receiver may be a microwave receiver.

In addition, the second access network device may further include a radio frequency transceiver that communicates with the terminal device.

The transmitter 1802, the memory, and the receiver each may be directly connected to the processor 1801. Alternatively, the transmitter 1802, the memory, the receiver, and the processor 1801 each are connected to a bus, and the components communicate with each other by using the bus.

Embodiment 9

FIG. 19 is a schematic structural diagram of a first access network device according to Embodiment 9. As shown in FIG. 19, the first access network device includes:

a receiving module 1901, configured to receive a first air interface configuration message from a second access network device in a radio access network, where the first access network device and the second access network device use different wireless communications standards, and the first air interface configuration message includes air interface configuration information of an air interface between a terminal device and the radio access network; and a first sending module 1902, configured to send the first air interface configuration message to the terminal device, where the air interface between the terminal device and the radio access network includes a first air interface and a second air interface; the first air interface includes a first air interface protocol layer and a second air interface protocol layer, the first air interface protocol layer is between the terminal device and the first access network device, the second air interface protocol layer is between the terminal device and the second access network device, and the second air interface protocol layer is above the first air interface protocol layer; the second air interface is an air interface between the terminal device and the second access network device; and the first air interface configuration message is a message of an air interface protocol layer that is included in the second air interface and that is used to configure an air interface.

The first access network device may further include a processing module, configured to perform processing and control operations of the first access network device.

For another optional implementation of the first access network device, refer to implementation of the first access network device 202 in Embodiment 3 or Embodiment 4. The processing module may be configured to perform processing and control operations of the first access network device

202. The first sending module 1902 may be configured to perform an operation of sending information to the terminal device 201 by the first access network device 202. The receiving module 1901 may be configured to perform an operation of receiving information from the second access network device 203 by the first access network device 202.

For a procedure in which the first access network device interacts with the second access network device and the terminal device, refer to the procedure in which the first access network device 202 interacts with the second access network device 203 and the terminal device 201 in the procedure shown in FIG. 9 or FIG. 10. For content and a structure of a message sent or received by the first access network device, also refer to the description of the procedure.

An optional implementation of the first access network device may be shown in FIG. 20. A first transmitter 2002 may be configured to implement a function of the first sending module 1902. A receiver 2001 may be configured to implement a function of the receiving module 1901. A processor may further be included, and may be configured to implement a function of the processing module. In addition, the first access network device may further include a memory, configured to store a program and data. The processor may perform processing and control by invoking the program stored in the memory.

The first transmitter 2002 may be a radio frequency transmitter. If the first access network device and the second access network device communicate with each other by means of optical fiber transmission, the receiver 2001 may be an optical receiver. If the first access network device and the second access network device communicate with each other by means of microwave transmission, the receiver 2001 may be a microwave receiver.

In addition, the first access network device may further include a radio frequency receiver receiving a message and/or data that are/is sent by the terminal device, and a second transmitter sending a message and/or data to the second access network device. The second transmitter may be an optical transmitter, a microwave transmitter, or the like.

The first transmitter 2002, the memory, and the receiver 2001 each may be directly connected to the processor. Alternatively, the first transmitter 2002, the memory, the receiver 2001, and the processor each are connected to a bus, and the components communicate with each other by using the bus.

Embodiment 10

FIG. 21 is a schematic structural diagram of a terminal device according to Embodiment 10. As shown in FIG. 21, the terminal device includes:

a receiving module 2101, configured to receive a first air interface configuration message from a first access network device, where the first air interface configuration message is from a second access network device, and is forwarded by the first access network device; the first access network device and the second access network device are located in a same radio access network, the first access network device and the second access network device use different wireless communications standards; and the first air interface configuration message includes air interface configuration information of an air interface between the terminal device and the radio access network; and a processing module 2102, configured to obtain the air interface configuration information from the first air interface configuration message, and configure the air interface between the terminal device and the radio access network according to the air interface configuration information, where the air interface between the terminal device and the radio access network includes a first air interface and a second air interface; the first air interface includes a first air interface protocol layer and a second air interface protocol layer, the first air interface protocol layer is between the terminal device and the first access network device, the second air interface protocol layer is between the terminal device and the second access network device, and the second air interface protocol layer is above the first air interface protocol layer; the second air interface is an air interface between the terminal device and the second access network device; and the first air interface configuration message is a message of an air interface protocol layer that is included in the second air interface and that is used to configure an air interface.

The terminal device may further include a sending module, configured to send a message and/or data to the first access network device and/or the second access network device.

For another optional implementation of the terminal device, refer to implementation of the terminal device 201 in Embodiment 3 or Embodiment 4. The processing module 2102 may be configured to perform processing and control operations of the terminal device 201. The sending module may be configured to perform an operation of sending information to the first access network device 202 or the second access network device 203 by the terminal device 201. The receiving module 2101 may be configured to perform an operation of receiving information from the second access network device 203 or the first access network device 202 by the terminal device 201.

For a procedure in which the terminal device interacts with the second access network device and the first access network device, refer to the procedure in which the terminal device 201 interacts with the second access network device 203 and the first access network device 202 in the procedure showgirl in FIG. 9 or FIG. 10. For content and a structure of a message sent or received by the terminal device, also refer to the description of the procedure.

An optional implementation of the terminal device may be shown in FIG. 22. A processor 2202 may be configured to implement a function of the processing module 2102. A receiver 2201 may be configured to implement a function of the receiving module 2101. A transmitter may further be included, and may be configured to implement a function of the sending module. In addition, the terminal device may further include a memory, configured to store a program and data. The processor 2202 may perform processing and control by invoking the program stored in the memory.

The transmitter may be a radio frequency transmitter. The receiver 2201 may be a radio frequency receiver.

The transmitter, the memory, and the receiver 2201 each may be directly connected to the processor 2202. Alternatively, the transmitter, the memory, the receiver 2201, and the processor 2202 each are connected to a bus, and the components communicate with each other by using the bus.

In conclusion, in this application, the second access network device sends the first air interface configuration message to configure an air interface between the terminal device and the radio access network, so as to provide, in a case in which the terminal device needs to access a wireless communications system by using two access network devices of different standards, a solution for successfully establishing a connection between the terminal device and the two radio access network devices.

It can be understood that, in the embodiments of this application, a manner of communication between the first access network device and the second access network device are not particularly limited. For example, the first access network device and the second access network device may communicate with each other by means of a microwave or an optical fiber. When the first access network device and the second access network device communicate with each other by means of a microwave, both the first access network device and the second access network device are internally provided with a microwave receiver and a microwave transmitter, or a microwave transceiver. When the first access network device and the second access network device communicate with each other by means of an optical fiber, both the first access network device and the second access network device are internally provided with an optical receiver and an optical transmitter, or an optical transceiver.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of this application, it should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as covering the embodiments and all changes and modifications falling within the scope of the present disclosure.

Obviously, persons skilled in the art can make various modifications and variations to the embodiments of this application without departing from the scope of the embodiments of this application. The present disclosure is intended to cover these modifications and variations provided that they fall within the protection scope defined by the following claims and their equivalent technologies.

What is claimed is:

1. A method for a radio access network including a first access network device and a second access network device using different wireless communications standards, the method comprising:
   determining, by the second access network device, air interface configuration information of an air interface of a terminal device for communications between the terminal device and the radio access network; and
   sending, by the second access network device, a first air interface configuration message comprising the air interface configuration information to the first access network device;
   wherein:
   a protocol stack of the air interface between the terminal device and the radio access network comprises a first air interface protocol layer and a second air interface protocol layer;
   the first air interface protocol layer is for communications between the terminal device and the first access network device;
   the second air interface protocol layer is for communications between the terminal device and the second access network device;
   the second air interface protocol layer is above the first air interface protocol layer;
   the second air interface protocol layer includes an air interface protocol layer used to configure the air interface; and
   the first air interface configuration message is a message of the air interface protocol layer used to configure the air interface.

2. The method according to claim 1, further comprises:
   receiving a third air interface configuration message from the first access network device before the determining the air interface configuration information;
   obtaining configuration information of the first air interface protocol layer from the third air interface configuration message; and
   wherein determining the air interface configuration information comprises: determining that the air interface configuration information comprises the configuration information of the first air interface protocol layer obtained from the third air interface configuration message.

3. The method according to claim 1, wherein the second access network device is a Long term Evolution (LTE) system access network device, and wherein the first access network device is a fifth generation (5G) system access network device.

4. The method according to claim 1, wherein the second access network device is an LTE base station, and wherein the air interface protocol layer used to configure the air interface is a radio resource control (RRC) layer.

5. The method according to claim 1, wherein the first air interface protocol layer includes radio link control (RLC) layer, media access control (MAC) layer, and physical (PHY) layer, and wherein the second air interface protocol layer includes packet data convergence protocol (PDCP) layer and radio resource control (RRC) layer.

6. A method for a radio access network including a first access network device and a second access network device using different wireless communications standards, the method comprising:
receiving, by the first access network device, a first air interface configuration message from the second access network device, wherein the first air interface configuration message comprises air interface configuration information of an air interface of a terminal device for communications between the terminal device and the radio access network; and
sending, by the first access network device, the first air interface configuration message to the terminal device;
wherein:
a protocol stack of the air interface between the terminal device and the radio access network comprises a first air interface protocol layer and a second air interface protocol layer;
the first air interface protocol layer is for communications between the terminal device and the first access network device;
the second air interface protocol layer is for communications between the terminal device and the second access network device;
the second air interface protocol layer is above the first air interface protocol layer;
the second air interface protocol layer includes an air interface protocol layer used to configure the air interface; and
the first air interface configuration message is a message of the air interface protocol layer used to configure the air interface.

7. The method according to claim 6, further comprises:
sending a third air interface configuration message to the second access network device, wherein the third air interface configuration message is for obtaining configuration information of the first air interface protocol layer.

8. The method according to claim 6, wherein the second access network device is a Long term Evolution (LTE) system access network device, and wherein the first access network device is a fifth generation (5G) system access network device.

9. The method according to claim 6, wherein the second access network device is an LTE base station, and wherein the air interface protocol layer used to configure the air interface is a radio resource control (RRC) layer.

10. The method according to claim 6, wherein the first air interface protocol layer includes radio link control (RLC) layer, media access control (MAC) layer, and physical (PHY) layer, and wherein the second air interface protocol layer includes packet data convergence protocol (PDCP) layer and radio resource control (RRC) layer.

11. A method, comprising:
receiving, by a terminal device, a first air interface configuration message from a first access network device, wherein the first air interface configuration message is from a second access network device, and is forwarded by the first access network device, wherein the first access network device and the second access network device are located in a same radio access network, wherein the first access network device and the second access network device use different wireless communications standards, and wherein the first air interface configuration message comprises air interface configuration information of an air interface of the terminal device for communications between the terminal device and the radio access network; and
obtaining, by the terminal device, the air interface configuration information from the first air interface configuration message, and configuring the air interface between the terminal device and the radio access network according to the air interface configuration information;
wherein:
a protocol stack of the air interface between the terminal device and the radio access network comprises a first air interface protocol layer and a second air interface protocol layer;
the first air interface protocol layer is for communications between the terminal device and the first access network device;
the second air interface protocol layer is for communications between the terminal device and the second access network device;
the second air interface protocol layer is above the first air interface protocol layer;
the second air interface protocol layer includes an air interface protocol layer used to configure the air interface; and
the first air interface configuration message is a message of the air interface protocol layer used to configure the air interface.

12. The method according to claim 11, wherein the first air interface protocol layer includes radio link control (RLC) layer, media access control (MAC) layer, and physical (PHY) layer, and wherein the second air interface protocol layer includes packet data convergence protocol (PDCP) layer and radio resource control (RRC) layer.

13. A radio access network, wherein the network comprises:
a first access network device and a second access network device, wherein the first access network device and the second access network device use different wireless communications standards;
wherein the second access network device comprises:
a non-transitory memory storage comprising second instructions; and
a second hardware processor in communication with the non-transitory memory storage, wherein the second hardware processor executes the second instructions to perform operations comprising:
determining air interface configuration information of an air interface of a terminal device for communications between the terminal device and the radio access network;
sending a first air interface configuration message comprising the air interface configuration information to the first access network device; and
the first access network device, comprises:
a non-transitory memory storage comprising first instructions; and
a first hardware processor in communication with the non-transitory memory storage, wherein the first hardware processor executes the first instructions to perform operations comprising:

receiving the first air interface configuration message from the second access network device;

sending the first air interface configuration message to the terminal device;

wherein:
- a protocol stack of the air interface between the terminal device and the radio access network comprises a first air interface protocol layer and a second air interface protocol layer;
- the first air interface protocol layer is for communications between the terminal device and the first access network device;
- the second air interface protocol layer is for communications between the terminal device and the second access network device;
- the second air interface protocol layer is above the first air interface protocol layer;
- the second air interface protocol layer includes an air interface protocol layer used to configure the air interface; and
- the first air interface configuration message is a message of the air interface protocol layer used to configure the air interface.

14. The radio access network according to claim 13, wherein the first hardware processor executes the first instructions to perform operations comprising:

sending a third air interface configuration message to the second access network device, wherein the third air interface configuration message is for obtaining configuration information of the first air interface protocol layer; and wherein the second hardware processor executes the second instructions to perform operations comprising:

receiving the third air interface configuration message from the first access network device before the determining the air interface configuration information;

obtaining configuration information of the first air interface protocol layer from the third air interface configuration message; and determining that the air interface configuration information comprises the configuration information of the first air interface protocol layer.

15. The network according to claim 13, wherein the second access network device is a Long term Evolution (LTE) system access network device, and wherein the first access network device is a fifth generation (5G) system access network device.

16. The network according to claim 13, wherein the second access network device is an LTE base station, and wherein the air interface protocol layer used to configure the air interface is a radio resource control (RRC) layer.

17. The network according to claim 13, wherein the first air interface protocol layer includes radio link control (RLC) layer, media access control (MAC) layer, and physical (PHY) layer, and wherein the second air interface protocol layer includes packet data convergence protocol (PDCP) layer and radio resource control (RRC) layer.

* * * * *

UNITED STATES PATENT AND TRADEMARK OFFICE
CERTIFICATE OF CORRECTION

PATENT NO. : 10,999,749 B2  
APPLICATION NO. : 16/853009  
DATED : May 4, 2021  
INVENTOR(S) : Haiyan Luo et al.

Page 1 of 1

It is certified that error appears in the above-identified patent and that said Letters Patent is hereby corrected as shown below:

In the Specification

In Column 1, Line 11, delete "No," and insert -- No. --, therefor.

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*